US008351044B2

(12) United States Patent  
Matsumoto et al.

(10) Patent No.: US 8,351,044 B2  
(45) Date of Patent: Jan. 8, 2013

(54) SPECTRAL IMAGING APPARATUS PROVIDED WITH SPECTRAL TRANSMITTANCE VARIABLE ELEMENT AND METHOD OF ADJUSTING SPECTRAL TRANSMITTANCE VARIABLE ELEMENT IN SPECTRAL IMAGING APPARATUS

(75) Inventors: Shinya Matsumoto, Machida (JP); Koki Morishita, Hachioji (JP); Motohiro Mitamura, Mitaka (JP)

(73) Assignee: Olympus Corporation, Tokyo (JP)

( * ) Notice: Subject to any disclaimer, the term of this patent is extended or adjusted under 35 U.S.C. 154(b) by 487 days.

(21) Appl. No.: 12/729,628

(22) Filed: Mar. 23, 2010

(65) Prior Publication Data  
US 2010/0250182 A1 Sep. 30, 2010

(30) Foreign Application Priority Data

Mar. 24, 2009 (JP) ................. 2009-072900  
Mar. 18, 2010 (JP) ................. 2010-062894

(51) Int. Cl.  
*G01J 3/45* (2006.01)

(52) U.S. Cl. ........................ 356/454; 356/456

(58) Field of Classification Search .................. 356/454, 356/480, 506, 519, 456  
See application file for complete search history.

(56) References Cited

U.S. PATENT DOCUMENTS

| 3,984,190 | A | * | 10/1976 | Barrett et al. ................ 356/454 |
| 5,127,731 | A | * | 7/1992 | DeGroot ...................... 356/486 |
| 5,357,340 | A | * | 10/1994 | Zochbauer .................... 356/454 |
| 5,646,762 | A | | 7/1997 | Delavaux et al. |
| 6,043,883 | A | * | 3/2000 | Leckel et al. ................. 356/454 |
| 2002/0080367 | A1 | * | 6/2002 | Asami .......................... 356/519 |
| 2005/0195401 | A1 | * | 9/2005 | Cao et al. ..................... 356/454 |
| 2005/0237416 | A1 | | 10/2005 | Hasegawa |
| 2009/0303318 | A1 | | 12/2009 | Hasegawa |

FOREIGN PATENT DOCUMENTS

| JP | 9-186673 | 7/1997 |
| JP | 2005-308688 | 11/2005 |

* cited by examiner

*Primary Examiner* — Hwa Lee  
(74) *Attorney, Agent, or Firm* — Scully Scott Murphy & Presser, PC

(57) ABSTRACT

A spectral imaging apparatus includes: a spectral transmittance variable element having a spectral transmittance characteristics such that a transmittance periodically varies with wavelength and being capable of changing the variation period, for converting light from an object under observation into light having a plurality of peak wavelengths; a light extracting device for extracting, from the light having a plurality of peak wavelengths, light for imaging that contains a peak wavelength proximate to a predetermined command wavelength designated by a user and light for calibration that contains a peak wavelength other than the peak wavelength proximate to the command wavelength; an image sensor for capturing an image of the object under observation formed of the light for imaging; a detector for detecting, from the light for calibration, the peak wavelength other than the peak wavelength proximate to the command wavelength; and a control unit including, an operation processing section that calculates the peak wavelength that is proximate to the command wavelength and is contained in the light for imaging, from the peak wavelength that is other than the peak wavelength proximate to the command wavelength, is contained in the light for calibration and is detected by the detector, calculates an amount of shift between the peak wavelength proximate to the command wavelength as calculated and the command wavelength, and determines an amount of adjustment of the variation period on a basis of the amount of shift, and a drive processing section that drives the spectral transmittance variable element for changing the variation period.

10 Claims, 20 Drawing Sheets

TRANSMITTANCE CHARACTERISTIC OF IMAGE PICKING-UP FILTER

SPECTRAL IMAGING APPARATUS PROVIDED WITH SPECTRAL TRANSMITTANCE VARIABLE ELEMENT AND METHOD OF ADJUSTING SPECTRAL TRANSMITTANCE VARIABLE ELEMENT IN SPECTRAL IMAGING APPARATUS

This application claims benefits of Japanese Patent Application No. 2009-72900 filed in Japan on Mar. 24, 2009 and No. 2010-62894 filed in Japan on Mar. 18, 2010, the contents of which are hereby incorporated by reference.

BACKGROUND OF THE INVENTION

1) Field of the Invention

The present invention relates to a spectral imaging apparatus provided with a spectral transmittance variable element and a method of adjusting a spectral transmittance variable element in a spectral imaging apparatus.

2) Description of Related Art

Conventionally, there have been used, in the fields such as image observation and optical communication, spectral transmittance variable elements that have spectral transmittance characteristics such that the transmittance is variable with wavelength, are capable of changing the period of variation, and convert entering or reflecting light into light having a plurality of peak wavelengths.

As apparatuses using such spectral transmittance variable elements, for instance, there are known an optical communication system disclosed in JP Kokai No. Hei 09-186673 and an image observation apparatus disclosed in JP Kokai No. 2005-308688.

In the optical communication system disclosed in JP Kokai No. Hei 09-186673 and the image observation apparatus disclosed in JP Kokai No. 2005-308688, Fabry-Pérot etalons are used as spectral transmittance variable elements. The Fabry-pérot etalons make use of interference of light, and are capable of changing wavelengths of light which they can transmit or reflect by changing a distance between a pair of mirror surfaces arranged to face each other. Such mirror surfaces of a Fabry-Pérot etalon usually are formed by application of coating on optical substrates such as quartz.

In the optical communication system disclosed in JP Kokai No. Hei 09-86673, the configuration is made so that calibration is performed in a path of light for calibration provided independent of a path of light for transmission.

SUMMARY OF THE INVENTION

A spectral imaging apparatus of the present invention is characterized by including: a spectral transmittance variable element having spectral transmittance characteristics such that a transmittance periodically varies with wavelength and being capable of changing the variation period, for converting light from an object under observation into light having a plurality of peak wavelengths; a light extracting means for extracting, from the light having a plurality of peak wavelengths, light for imaging that contains a peak wavelength proximate to a predetermined command wavelength designated by a user and light for calibration that contains a peak wavelength other than the peak wavelength proximate to the command wavelength; an image sensor for capturing an image of the object under observation formed of the light for imaging; a detector for detecting, from the light for calibration, the peak wavelength other than the peak wavelength proximate to the command wavelength; and a control means including an operation processing section that calculates the peak wavelength that is proximate to the command wavelength and is contained in the light for imaging, from the peak wavelength that is other than the peak wavelength proximate to the command wavelength, is contained in the light for calibration and is detected by the detector, calculates an amount of shift between the peak wavelength proximate to the command wavelength as calculated and the command wavelength, and determines an amount of adjustment of the variation period on a basis of the amount of shift, and a drive processing section that drives the spectral transmittance variable element for changing the variation period.

In the spectral imaging apparatus of the present invention, it is preferred that the light extracting means is a dichroic mirror.

In the spectral imaging apparatus of the present invention, it is preferred that the light extracting means is configured of a beam splitter arranged in a path of light transmitted through the spectral transmittance variable element, a filter arranged in one of paths of light, as split by the beam splitter, for transmitting only the light for imaging, and a filter arranged in another of the paths of light, as split by the beam splitter, for transmitting only the light for calibration.

In the spectral imaging apparatus of the present invention, it is preferred that the light extracting means is configured of a filter arranged on an image-sensor side of the spectral transmittance variable element for transmitting only the light for imaging out of light that is transmitted through the spectral transmittance variable element, a half mirror arranged between the spectral transmittance variable element and the object under observation for transmitting light from the object under observation and for reflecting light that is reflected from the spectral transmittance variable element, and a filter for transmitting only the light for calibration out of light from the half mirror.

It is preferred that the spectral imaging apparatus of the present invention is provided with a light source for calibration that emits light in a wavelength band including the peak wavelength contained in the light for calibration and not including the peak wavelength contained in the light for imaging, and a path combining means arranged between the object under observation and the spectral transmittance variable element for combining a path of light from the light source for calibration and a path of light from the object under observation.

In the spectral imaging apparatus of the present invention, it is preferred that the spectral transmittance variable element is provided with a pair of substrates arranged to face each other and is capable of changing the variation period of the spectral transmittance characteristics by changing a surface interval between the pair of substrates.

In the spectral imaging apparatus of the present invention, it is preferred that the peak wavelength other than the peak wavelength proximate to the command wavelength is a peak wavelength adjacent to the peak wavelength proximate to the command wavelength.

In the spectral imaging apparatus of the present invention, it is preferred, in a case where a light source for calibration is provided, that the peak wavelength other than the peak wavelength proximate to the command wavelength is a peak wavelength residing adjacent to the peak wavelength proximate to the command wavelength on a shorter wavelength side than the peak wavelength proximate to the command wavelength, that the spectral transmittance variable element is provided with a pair of substrates arranged to face each other and is capable of changing the variation period of the spectral transmittance characteristics by changing a surface interval between the pair of substrates, and that light emanating from the light source for calibration satisfies the following conditions (1) and (2):

$$\lambda_{m+1} - \frac{FWHM_{m+1}}{2} \le \lambda_{ref} \le \lambda_{m+1} + \frac{FWHM_{m+1}}{2} \quad (1)$$

$$\lambda_{m+2} < \lambda_{ref} < \lambda_{Em-min} \quad (2)$$

where $$\lambda_{m+1} = \frac{m}{m+1} * \lambda_m$$

$$\lambda_{m+2} = \frac{m}{m+2} * \lambda_m$$

$$FWHM_{m+1} = \frac{\lambda_{m+1}^2}{m * \lambda_m} * \frac{1-R}{\pi\sqrt{R}}$$

$$2nd \cos\theta = m\lambda_m$$

where m is an integer equal to or greater than 1, $\lambda_{ref}$ is a wavelength band of the light source for calibration, $\lambda_m$ is the peak wavelength proximate to the command wavelength, $\lambda_{m+1}$ and $\lambda_{m+2}$ are peak wavelengths other than the peak wavelength proximate to the command wavelength, $\lambda_{Em-min}$ is a shortest wavelength of light incident on the image sensor, $FWHM_{m+1}$ is a full width at half maximum of the peak wavelength $\lambda_{m+1}$, R is a reflectance of surfaces, which face each other, of the pair of substrates, n is a refractive index of a medium between the pair of substrates, d is the surface interval between the pair of substrates, θ is an angle of incidence of light from the object under observation on the pair of substrates.

In the spectral imaging apparatus of the present invention, it is preferred that the peak wavelength other than the peak wavelength proximate to the command wavelength is a peak wavelength residing adjacent to the peak wavelength proximate to the command wavelength on a longer wavelength side than the peak wavelength proximate to the command wavelength, that the spectral transmittance variable element is provided with a pair of substrates arranged to face each other and is capable of changing the variation period of the spectral transmittance characteristics by changing a surface interval between the pair of substrates, and that light emanating from the light source for calibration satisfies the following conditions (1)' and (2)':

$$\lambda_{m-1} - \frac{FWHM_{m-1}}{2} \le \lambda_{ref} \le \lambda_{m-1} + \frac{FWHM_{m-1}}{2} \quad (1)'$$

$$\lambda_{Em-max} < \lambda_{ref} < \lambda_{m-2} \quad (2)'$$

where $$\lambda_{m-1} = \frac{m}{m-1} * \lambda_m$$

$$\lambda_{m-2} = \frac{m}{m-2} * \lambda_m$$

$$FWHM_{m-1} = \frac{\lambda_{m-1}^2}{m * \lambda_m} * \frac{1-R}{\pi\sqrt{R}}$$

$$2nd \cos\theta = m\lambda_m$$

where m is an integer equal to or greater than 3, $\lambda_{ref}$ is a wavelength band of the light source for calibration, $\lambda_m$ is the peak wavelength proximate to the command wavelength, $\lambda_{m-1}$ and $\lambda_{m-2}$ are peak wavelengths other than the peak wavelength proximate to the command wavelength, $\lambda_{Em-max}$ is a longest wavelength of light incident on the image sensor, $FWHM_{m-1}$ is a full width at half maximum of the peak wavelength $\lambda_{m-1}$, R is a reflectance of surfaces, which face each other, of the pair of substrates, n is a refractive index of a medium between the pair of substrates, d is the surface interval between the pair of substrates, and θ is an angle of incidence of light from the object under observation on the pair of substrates.

A method of adjusting a spectral imaging apparatus that is provided with a spectral transmittance variable element having spectral transmittance characteristics such that a transmittance periodically varies with wavelength and being capable of changing the variation period, for converting light from an object under observation into light having a plurality of peak wavelengths and an image sensor for capturing an image of the object under observation with light in a wavelength band proximate to a command wavelength designated by a user is characterized in that a light extracting means extracts, from the light having a plurality of peak wavelengths as converted by the spectral transmittance variable element, light for imaging that contains a peak wavelength proximate to the command wavelength and light for calibration that contains a peak wavelength other than the peak wavelength proximate to the command wavelength, and in that a control means calculates the peak wavelength that is proximate to the command wavelength and is contained in the light for imaging, from the peak wavelength that is other than the peak wavelength proximate to the command wavelength, is contained in the light for calibration and is detected by a detector, calculates an amount of shift between the peak wavelength proximate to the command wavelength as calculated and the command wavelength, and adjusts the variation period of the spectral transmittance variable element on a basis of the amount of shift.

According to the present invention, it is possible to provide a spectral imaging apparatus having a spectral transmittance variable element and being capable of performing a highly precise calibration at a desired timing, and an adjustment method of a spectral transmittance variable element of a spectral imaging apparatus that can be conducted highly precisely at a desired timing.

These and other features and advantages of the present invention will become apparent from the following detailed description of the preferred embodiments when taken in conjunction with the accompanying drawings.

DETAILED DESCRIPTION OF THE PREFERRED EMBODIMENTS

Preceding the explanation of embodiments of the spectral imaging apparatus of the present invention, an explanation is made on the spectral transmittance variable element included in the spectral imaging apparatus of the present invention in reference to the drawings.

Figure 1:
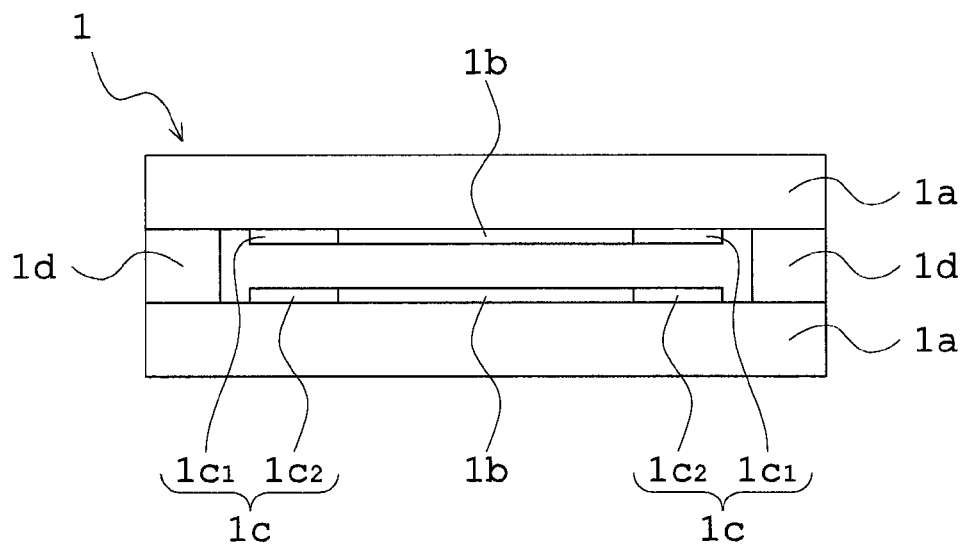
FIG. 1. is a sectional view that schematically shows the configuration of an etalon, which is one example of the spectral transmittance variable element used in the present invention.
Figure 2:
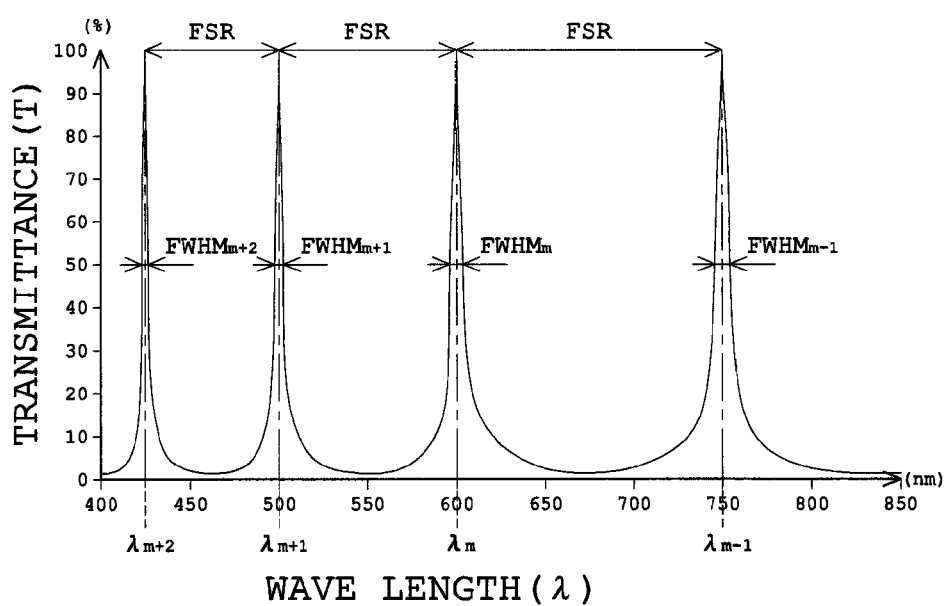
FIG. 2 is a characteristics diagram that shows one example of characteristics on transmittance for wavelength, of the etalon of FIG. 1.

FIG. 1. is a sectional view that schematically shows the configuration of an etalon, which is one example of the spectral transmittance variable element used in the present invention. FIG. 2 is a characteristics diagram that shows one example of characteristics on transmittance for wavelength, of the etalon of FIG. 1.

As a typical spectral transmittance variable element to be used in the spectral imaging apparatus of the present invention, a Fabry-Perot etalon of air-gap type is known. Thus, the following explanation is made on the spectral transmittance variable element of the present invention using this etalon.

As shown in FIG. 1, the etalon 1 is configured of a pair of optical substrates $1a$ arranged to face each other, reflecting coats $1b$, capacitive sensors $1c$, and piezoelectric elements $1d$.

The pair of optical substrates $1a$ are constructed of two plates made of transparent material such as precisely ground glass arranged to keep high parallelism.

The two reflecting coat $1b$ are formed on surfaces facing each other of the pair of optical substrates, at least at portions where a bundle of rays to be transmitted through the etalon passes, to face each other.

Each of the two capacitive sensors $1d$ is constructed of an electrode $1c_1$ and an electrode $1c_2$, which are arranged on the surfaces facing each other of the pair of optical substrates $1a$ at portions that do not block the bundle of rays transmitted through the etalon 1, to face each other. These capacitive sensors $1c$ have characteristics such that the capacitance between the electrode $1c_1$ and the electrode $1c_2$ varies in proportion with the surface interval, and are designed to convert the capacitance to a voltage signal as an output.

The plurality of piezoelectric elements $1d$ are fixed between the pair of optical substrates $1a$ facing each other at portions that do not block the bundle of rays transmitted through the etalon 1. These piezoelectric elements $1d$ are designed so that the interval between the surfaces facing each other of the pair of optical substrates $1a$, consequently, the surface interval between the two reflecting coats $1b$ can be changed by applying a voltage thereto.

The etalon 1 thus configured has spectral transmittance characteristics such that the transmittance greatly varies with wavelength periodically, as shown in FIG. 2. Therefore, light transmitted through the etalon 1 or light reflected from the etalon 1 is converted into light having a plurality of peak wavelengths.

In addition, the etalon thus configured has spectral transmittance characteristics characterized in that they are determined by the structure of the etalon itself. For example, a transmittance (T) for a wavelength is determined by reflectance of the reflecting coat, etc. A variation period of transmittance for wavelength, or a free spectral range (FSR) which is an interval between peak wavelengths, is determined by a surface interval between the two reflecting coats, etc. Further, a full with at half maximum (FWHM) of wavelength with respect to transmittance (T) is determined by a free spectral range. That is, the spectral transmittance characteristics shown in FIG. 2 are only one example of the spectral transmittance characteristics of the etalon 1.

To be specific, where a refractive index of a medium between the two reflecting coats 1b facing each other is denoted by n, a distance between the reflecting coats 1b is denoted by d, and an angle of incidence of light is denoted by θ, the spectral transmittance characteristics of the etalon thus configured have a maximum value of transmittance at a wavelength $\lambda_m$ satisfying the following condition:

$$2nd \cos \theta = m\lambda_m$$

where m is an integer equal to or greater than 1.

Also, transmittance (T) of the etalon thus configured is expressed by the following equation:

$$T = \frac{1}{1 + \frac{4R}{(1-R)^2} \sin^2\left(\frac{2\pi nd}{\lambda} \cos\theta\right)}$$

where a reflectance of one surface of the reflecting coats 1b is denoted by R.

Also, a free spectral range (FSR) of the etalon thus configured is expressed by the following equation:

$$FSR = \frac{\lambda}{2nd}$$

Further, a full width at half maximum (FWHM) of the etalon thus configured is expressed by the following equation:

$$FWHM = FSR * \frac{1-R}{\pi\sqrt{R}} = \frac{\lambda^2}{2nd} * \frac{1-R}{\pi\sqrt{R}}$$

Therefore, in the etalon 1, since the surface interval between the two reflecting coats 1b is freely changeable by the piezoelectric elements 1d, the free spectral range is freely changeable. That is, in the etalon 1, a wavelength at which the transmittance has a peak value can be calculated from the surface interval between the two reflecting coats 1b.

As stated above, it is noted that the etalon 1 is merely one example of the spectral transmittance variable element of the present invention. That is, those having transmittance characteristics similar to this etalon 1 may be used as the spectral transmittance variable element of the present invention.

Explanations will be made below in detail on the embodiments of the present invention in reference to the drawings.

Embodiment 1

A spectral imaging apparatus of this embodiment is explained in detail in reference to FIG. 3 through FIG. 10.

Figure 3:
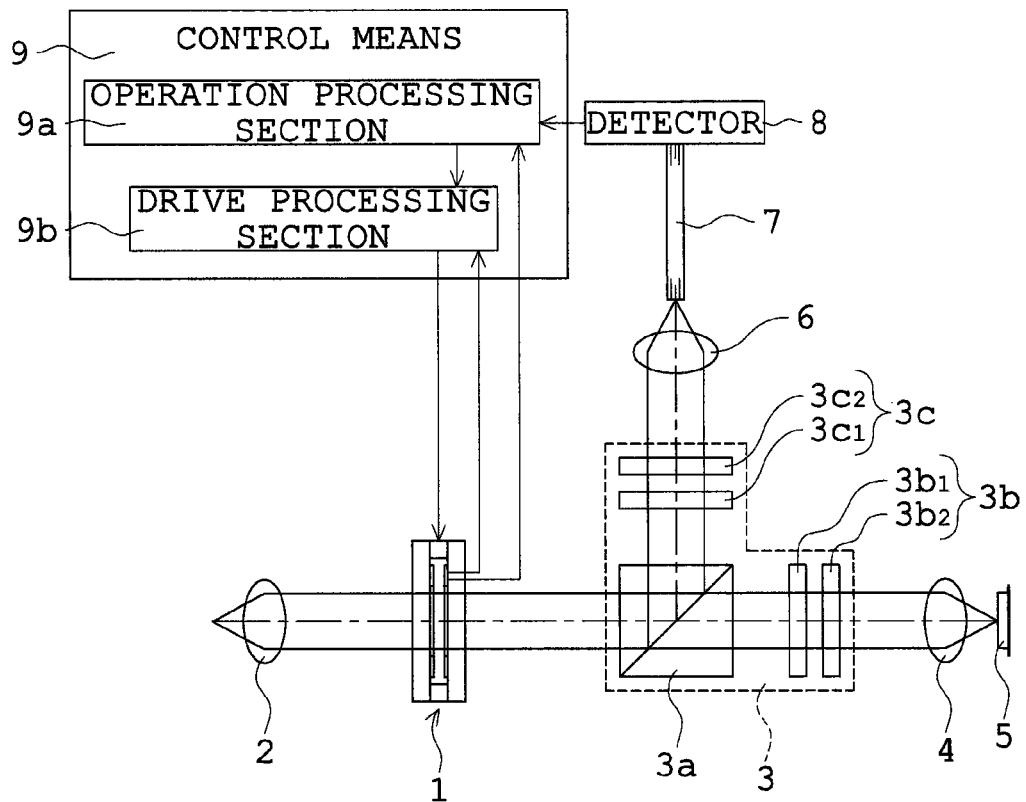
FIG. 3 is a schematic diagram that shows the configuration of a spectral imaging apparatus of Embodiment 1.
Figure 4:
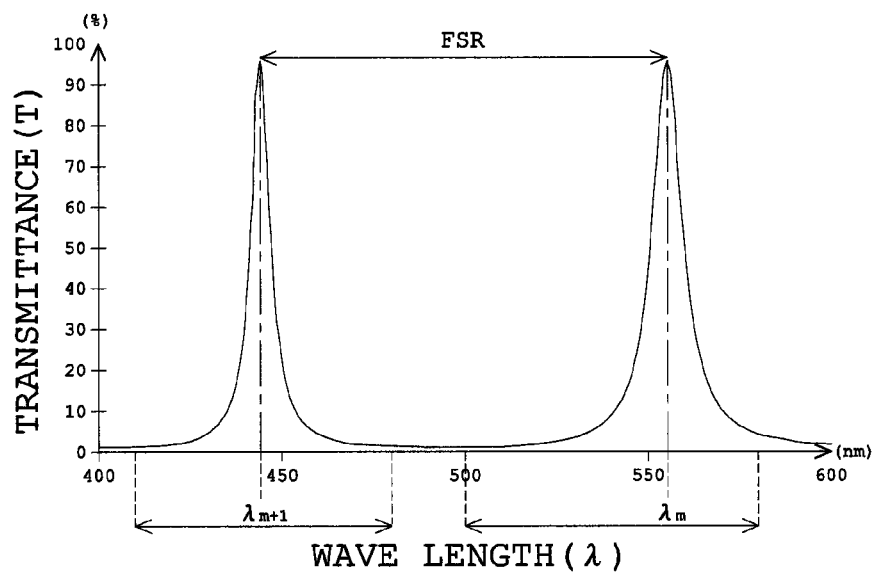
FIG. 4 is a characteristics diagram that shows one example of characteristics on transmittance for wavelength, of an etalon included in the spectral imaging apparatus of FIG. 3.
Figure 5:
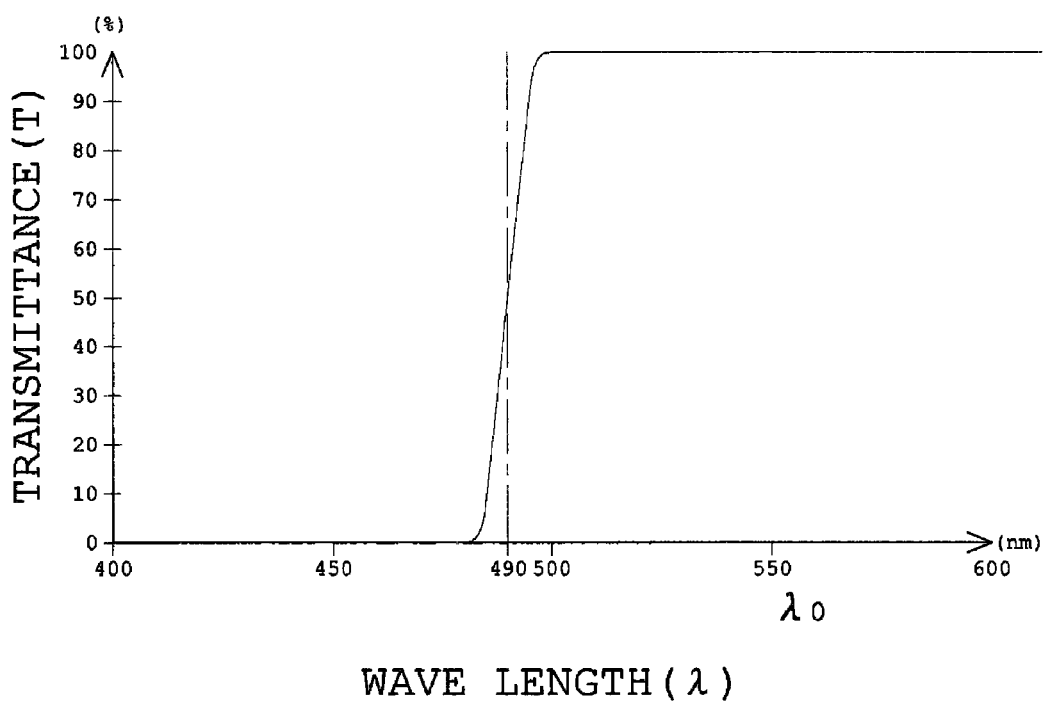
FIG. 5. is a characteristics diagram that shows characteristics on transmittance for wavelength, of a dichroic mirror included in the spectral imaging apparatus of FIG. 3.
Figure 6A:
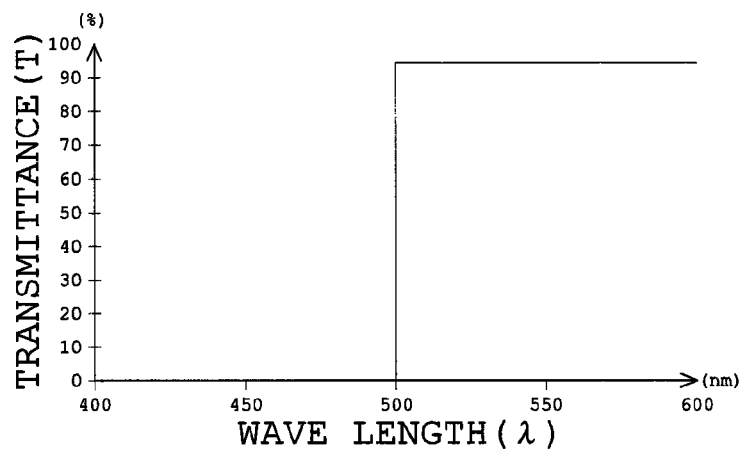
FIGS. 6A, 6B and 6C are characteristics diagrams that show characteristics on transmittance for wavelength, of filters for imaging included in the spectral imaging apparatus of FIG. 3, specifically showing transmittance characteristics of a first filter for imaging, transmittance characteristics of a second filter for imaging, and transmittance characteristics of the filters for imaging as a whole, respectively.
Figure 6B:
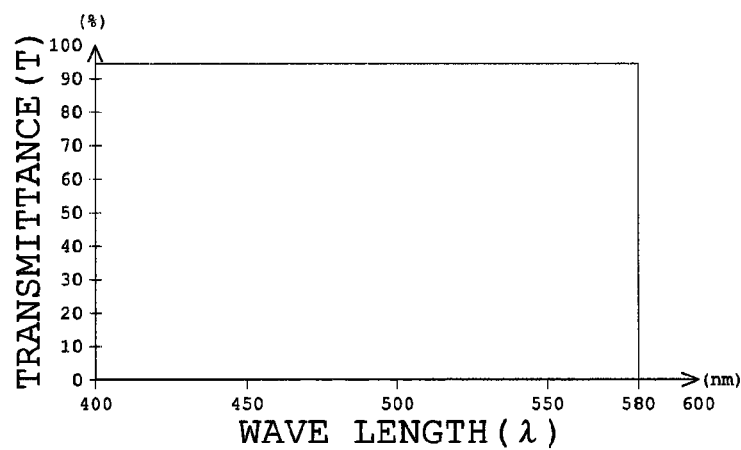
Figure 6C:
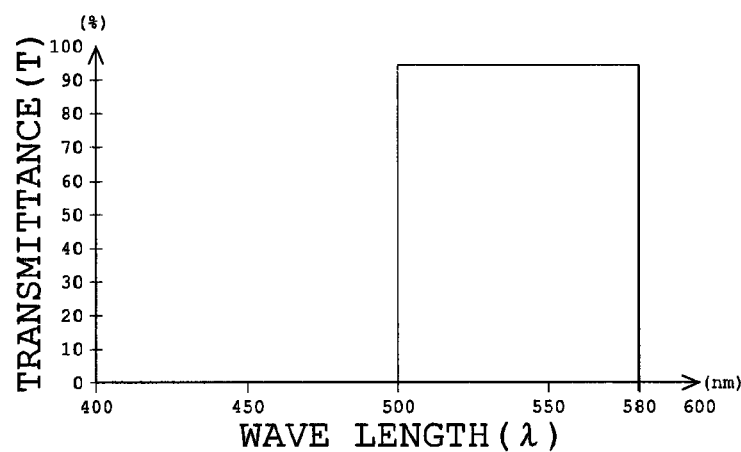
Figure 7A:
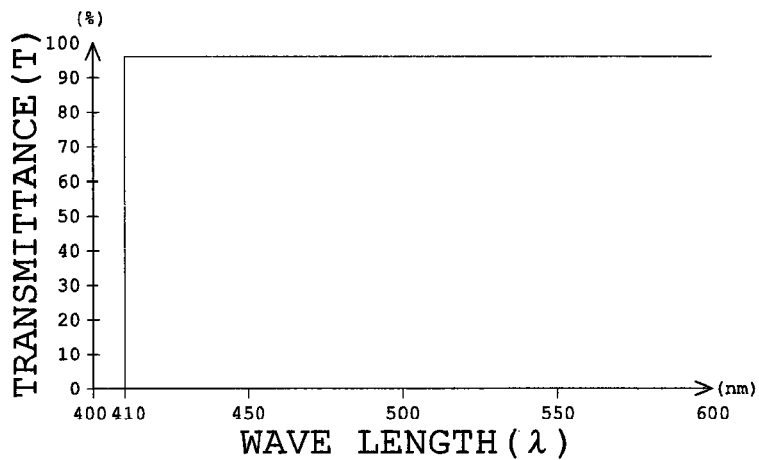
FIGS. 7A, 7B and 7C are characteristics diagrams that show characteristics on transmittance for wavelength, of filters for calibration included in the spectral imaging apparatus of FIG. 3, specifically showing transmittance characteristics of a first filter for calibration, transmittance characteristics of a second filter for calibration, and transmittance characteristics of the filters for calibration as a whole, respectively.
Figure 7B:
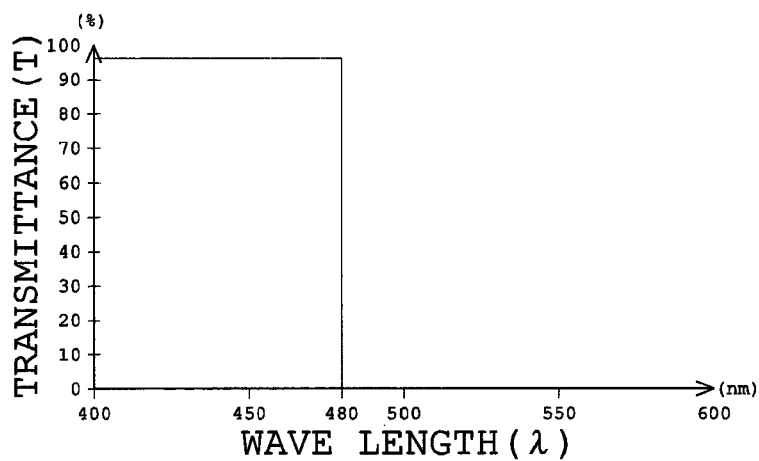
Figure 7C:
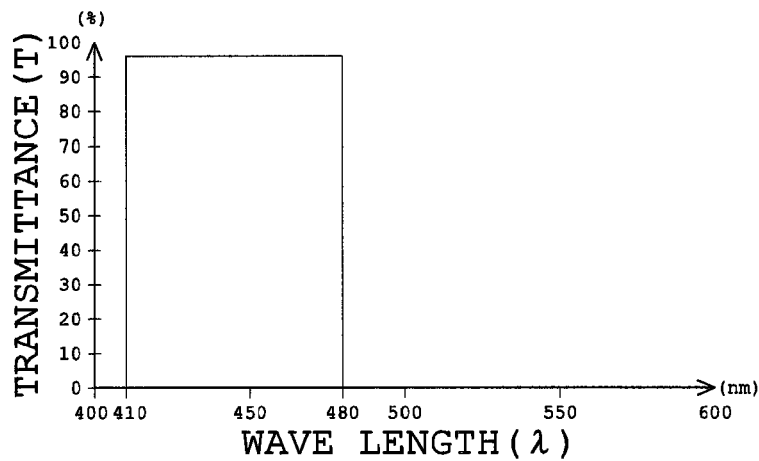
Figure 8:
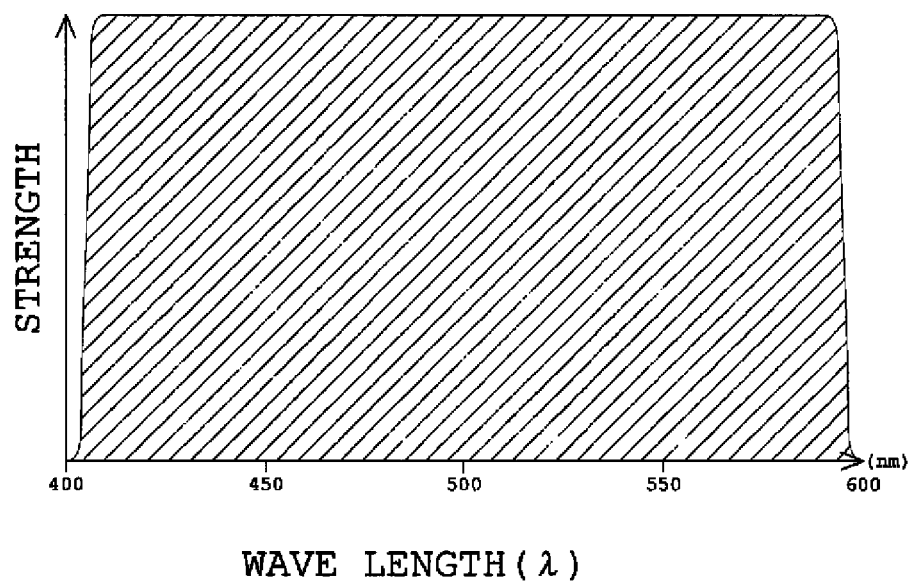
FIG. 8 is a characteristics diagram that shows intensity for wavelength of light incident on the spectral imaging apparatus of FIG. 3.
Figure 9:
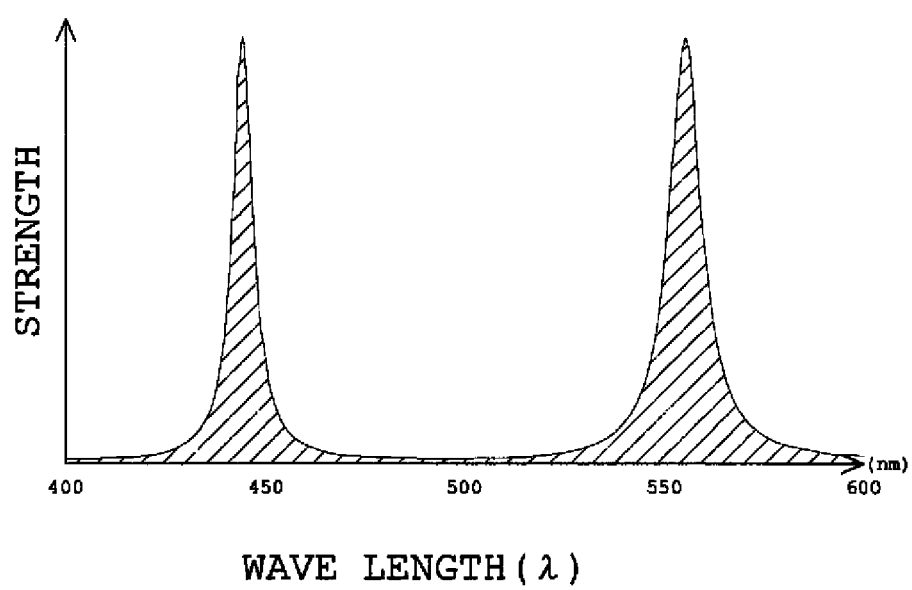
FIG. 9 is a characteristics diagram that shows intensity for wavelength of light transmitted through the spectral transmittance variable element included in the spectral imaging apparatus of FIG. 3.
Figure 10:
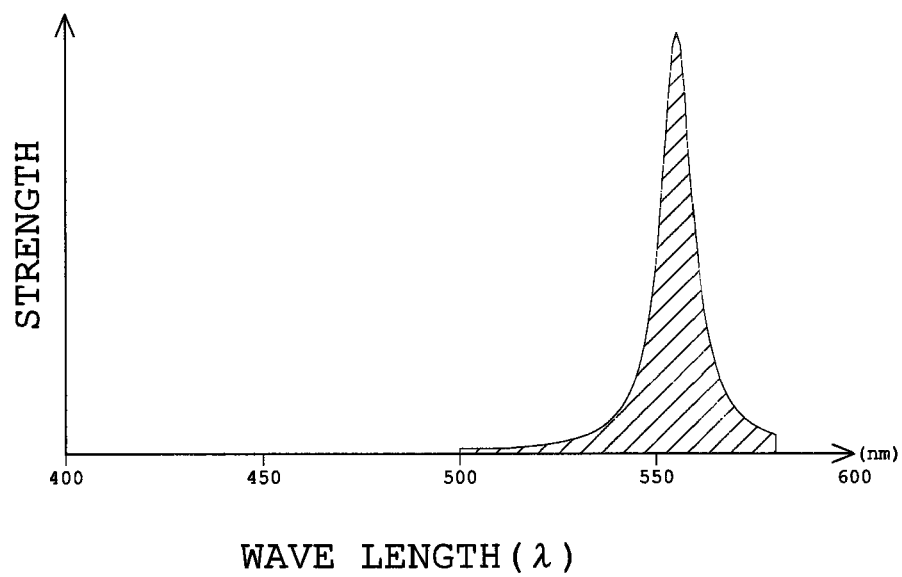
FIG. 10 is a characteristics diagram that shows intensity for wavelength of light transmitted through a filter for imaging of a light extracting means included in the spectral imaging apparatus of FIG. 3.
Figure 11:
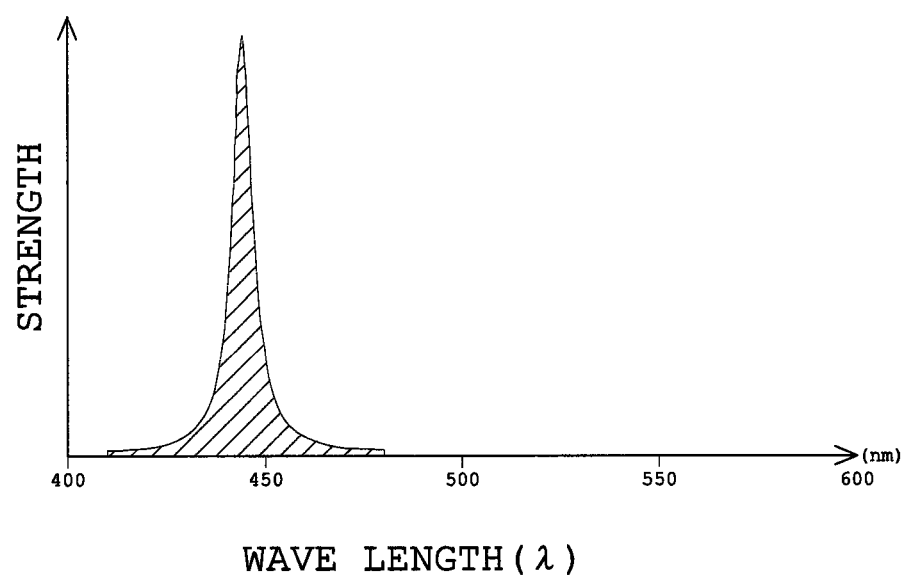
FIG. 11 is a characteristics diagram that shows intensity for wavelength of light transmitted through a filter for calibration of the light extracting means included in the spectral imaging apparatus of FIG. 3.

FIG. 3 is a schematic diagram that shows the configuration of the spectral imaging apparatus of this embodiment. FIG. 4 is a characteristics diagram that shows one example of characteristics on transmittance for wavelength, of an etalon included in the spectral imaging apparatus of FIG. 3. FIG. 5. is a characteristics diagram that shows characteristics on transmittance for wavelength, of a dichroic mirror included in the spectral imaging apparatus of FIG. 3. FIG. 6 are characteristics diagrams that show characteristics on transmittance for wavelength, of filters for imaging included in the spectral imaging apparatus of FIG. 3, where FIG. 6A shows transmittance characteristics of a first filter for imaging, FIG. 6B shows transmittance characteristics of a second filter for imaging, and FIG. 6C shows transmittance characteristics of the filters for imaging as a whole. FIG. 7 are characteristics diagrams that show characteristics on transmittance for wavelength, of filters for calibration included in the spectral imaging apparatus of FIG. 3, where FIG. 7A shows transmittance characteristics of a first filter for calibration, FIG. 7B shows transmittance characteristics of a second filter for calibration, and FIG. 7C shows transmittance characteristics of the filters for calibration as a whole. FIG. 8 is a characteristics diagram that shows intensity for wavelength of light incident on the spectral imaging apparatus of FIG. 3. FIG. 9 is a characteristics diagram that shows intensity for wavelength of light transmitted through the spectral transmittance variable element included in the spectral imaging apparatus of FIG. 3. FIG. 10 is a characteristics diagram that shows intensity for wavelength of light transmitted through a filter for imaging of a light extracting means included in the spectral imaging apparatus of FIG. 3. FIG. 11 is a characteristics diagram that shows intensity for wavelength of light transmitted through a filter for calibration of the light extracting means included in the spectral imaging apparatus of FIG. 3.

Figure 12:
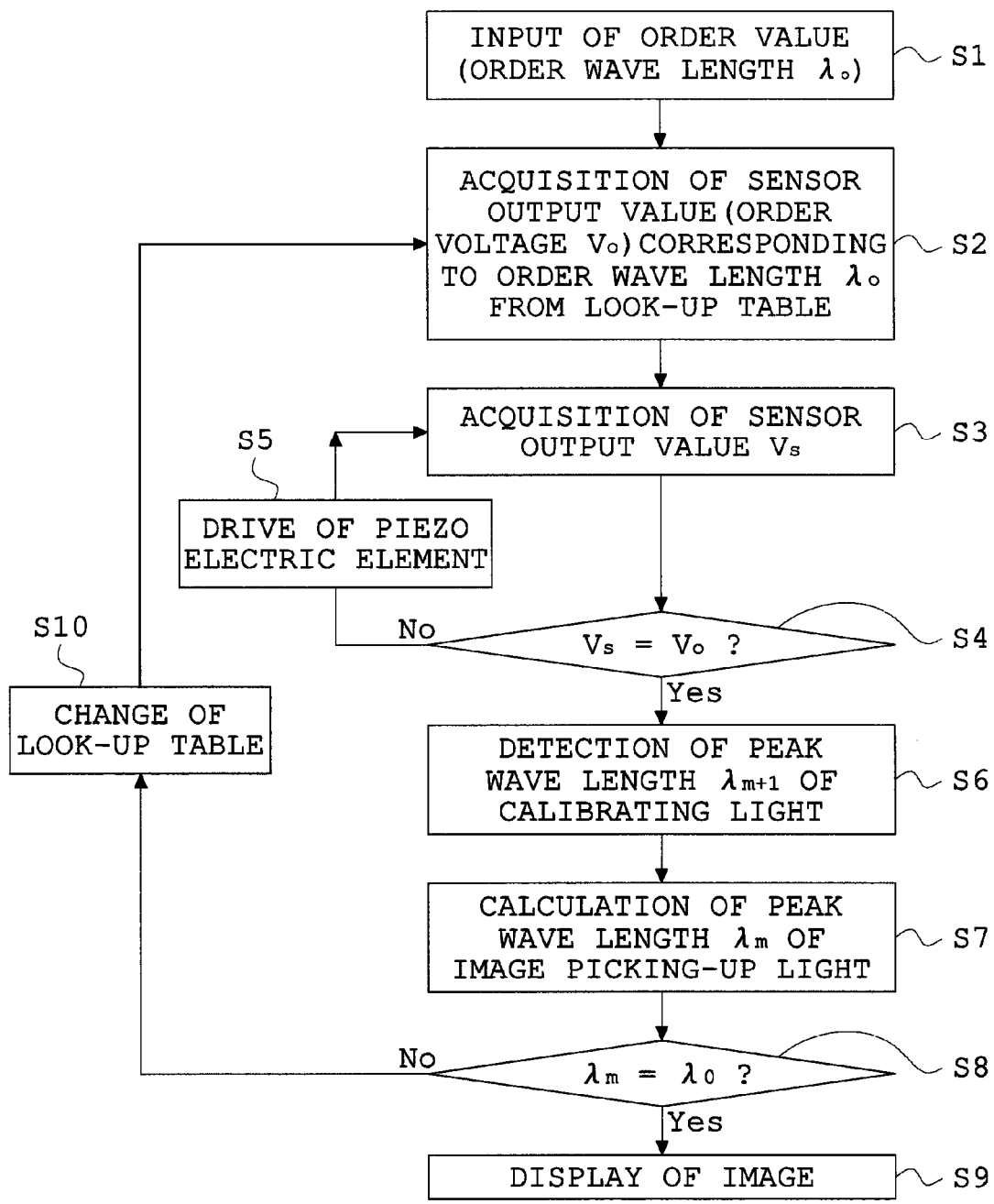
FIG. 12 is a flowchart that shows the operation procedure conducted by the spectral imaging apparatus of FIG. 3.
Figure 13:
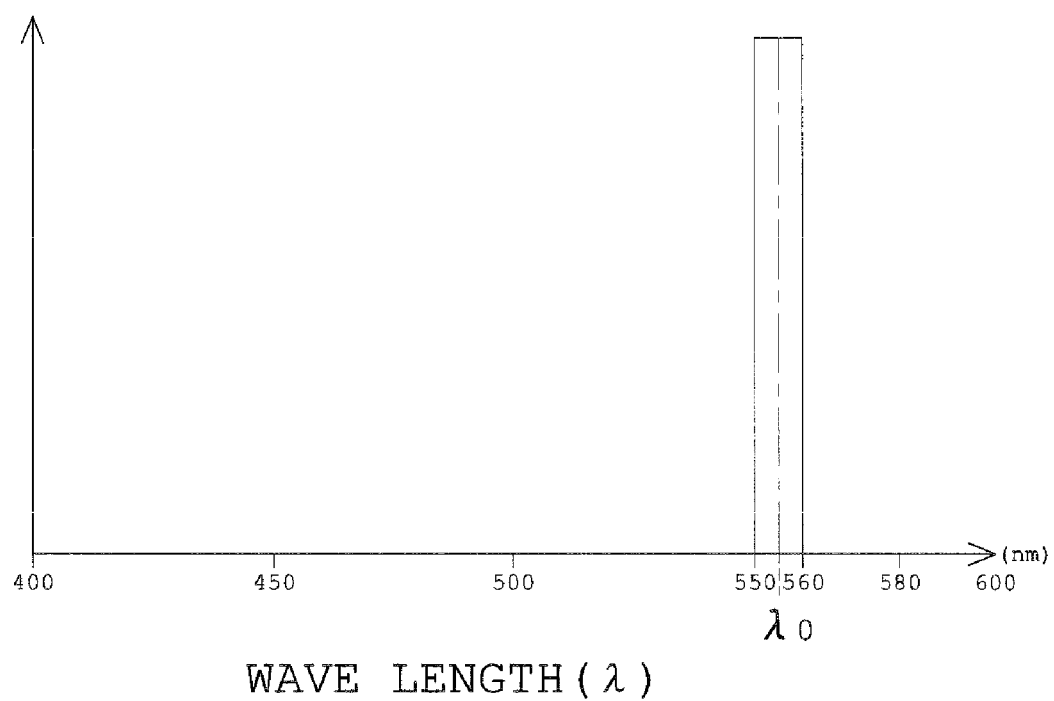
FIG. 13 is a characteristics diagram that shows a wavelength band proximate to a command wavelength designated by a user.
Figure 14A:
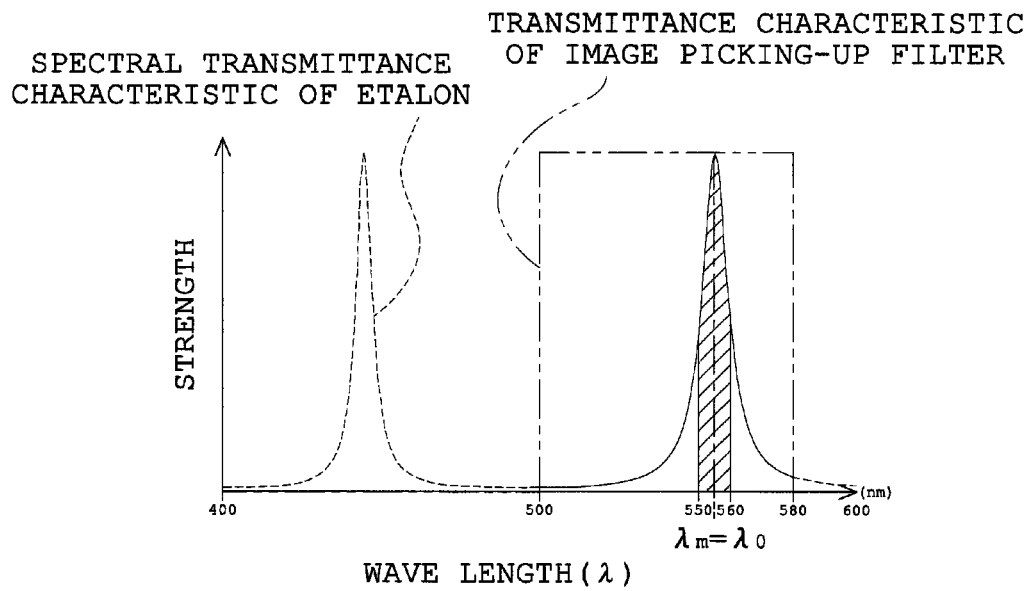
FIGS. 14A and 14B are characteristics diagrams that show intensity for wavelength of light incident on an image sensor included in the spectral imaging apparatus of FIG. 3, specifically showing the case where the peak wavelength of light converted by the etalon and the command wavelength designated by the user coincide with each other, and the case where they do not, respectively.
Figure 14B:
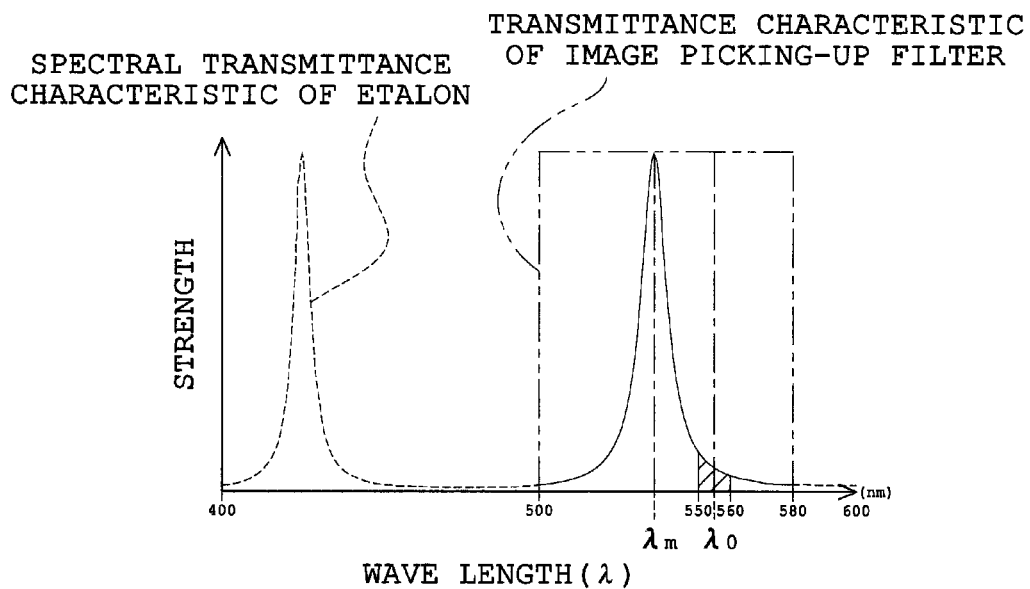

Further, FIG. 12 is a flow chart that shows the operation procedure conducted by the spectral imaging apparatus of FIG. 3. FIG. 13 is a characteristics diagram that shows a wavelength band proximate to a command wavelength designated by a user. FIG. 14 are characteristics diagrams that show intensity for wavelength of light incident on an image sensor included in the spectral imaging apparatus of FIG. 3, where FIG. 14A shows the case where the peak wavelength of light converted by the etalon and the command wavelength designated by the user coincide with each other, and FIG. 14B shows the case where they do not.

First, the configuration of the spectral imaging apparatus of this embodiment is explained in reference to FIG. 3 through FIG. 7.

As shown in FIG. 3, the spectral imaging apparatus of this embodiment is provided with an etalon 1, an objective optical system 2, a light extracting means 3, an image forming optical system 4, an image sensor 5, a condenser optical system 6, a light guide fiber 7, a detector 8, and a control means 9. The etalon 1 as a spectral transmittance variable element is arranged in a path of light emergent from the objective optical system 2.

The etalon 1 is configured similar to the etalon shown in FIG. 1. Therefore, as shown in FIG. 4, the etalon 1 has spectral transmittance characteristics such that the transmittance greatly varies with wavelength periodically, and is configured so that the variation period, or the free spectral range which is an interval between wavelengths at which transmittance takes peak values, can be changed as desired by changing the surface interval between the pair of optical substrates, and resultantly the surface interval between the reflecting coats formed thereon.

In this etalon 1, by changing the surface interval between the reflecting coats, it is possible to change, within a wavelength band of approximately 500-580 nm, the wavelength $\lambda_m$ at which the transmittance takes a peak value, and the wavelength $\lambda_{m+1}$, which is on the shorter wavelength side than the wavelength $\lambda_m$ and at which the transmittance takes a peak value, within a wavelength band of approximately 410-480 nm. The wavelength $\lambda_m$ is a wavelength with the ordinal numeral of m, and the wavelength $\lambda_{m+1}$ is a wavelength with the ordinal numeral of m+1.

The light extracting means 3 is configured of a dichroic mirror 3a arranged in a path of light emergent from the etalon 1, a filter 3b for imaging arranged in a path of light transmitted through the dichroic mirror 3a and directed toward the image forming optical system 4 and the image sensor 5, and a filter 3c for calibration arranged in a path of light reflected from the dichroic mirror 3a and directed toward the condenser optical system 6. The filter 3b for imaging includes a first filter 3b₁ for imaging and a second filter 3b₂ for imaging. The filter 3c for calibration includes a first filter 3c₁ for calibration and a second filter 3c₂ for calibration. As shown in FIG. 5, the dichroic mirror 3a has transmittance characteristics such as to transmit only light in a wavelength band containing the light for imaging (approximately 490 nm and longer) and to reflect remaining wavelengths bands (approximately 490 nm and shorter).

As shown in FIG. 6A, of the filter 3b for imaging, the first filter 3b₁ for imaging has transmittance characteristics such as to block light in wavelength bands approximately 500 nm and shorter. On the other hand, as shown in FIG. 6B, the second filter 3b₂ for imaging has transmittance characteristics such as to block light in wavelength bands approximately 580 nm and longer. Consequently, as shown in FIG. 6C, the filter 3b for imaging as a whole has transmittance characteristics such as to block light other than light in a wavelength band of approximately 500-580 nm. This wavelength band of light to be transmitted through the filter 3b for imaging is designed to substantially coincide with a wavelength range in which, of wavelengths where transmittance of the etalon 1 takes peak values, the longer wavelength-side wavelength $\lambda_m$ is variable.

As shown in FIG. 7A, of the filter 3c for calibration included in the light extracting means 3, the first filter 3c₁ for calibration has transmittance characteristics such as to block light in wavelength bands approximately 410 nm and shorter. On the other hand, as shown in FIG. 7B, the second filter 3c₂ for calibration has transmittance characteristics such as to block light in wavelength bands approximately 480 nm and longer. Consequently, as shown in FIG. 7C, the filter 3c for calibration as a whole has transmittance characteristics such as to block light other than light in a wavelength band of approximately 410-480 nm. This wavelength band of light to be transmitted through the filter 3c for calibration is designed to substantially coincide with a wavelength range in which, of wavelengths where transmittance of the etalon 1 takes peak values, the shorter wavelength-side wavelength $\lambda_{m+1}$ is variable.

The image sensor 5 is arranged such that its image pickup surface coincides with a position on which the image forming optical system 4 forms an image out of light that passes the filter 3b for imaging of the light extracting means 3. An image display means not shown is connected with the image sensor 5, and a captured image is displayed on the image display means.

The condenser optical system 6 is arranged in a path of light passing the filter 3c for calibration of the light extracting means 3, to condense the light onto an entrance end face of the light guide fiber 7. The light guide fiber 7 is connected with the detector 8, to guide the light condensed by the condenser optical system 6 to the detector 8. The detector 8 detects a peak wavelength out of the incident light as guided by the light guide fiber 7, or the light passing the filter 3c for calibration of the light extracting means 3.

The control means 9 is connected with the etalon 1 and the detector 8, and has, in its inside, an operation processing section 9a and a drive processing section 9b. The operation processing section 9a acquires information from the capacitive sensors 1c of the etalon 1 and information from the detector 8, to perform operation on the basis of the information. The drive processing section 9b drives the piezoelectric elements 1d of the etalon 1 on the basis of a command from the operation processing section 9a, and acquires information from the capacitive sensors 1c of the etalon 1, to perform feedback control.

Next, in reference to FIG. 3 through FIG. 11, the explanation is made on light passing the spectral imaging apparatus of this embodiment and its path.

Light from an object under observation is introduced to the etalon 1 by the objective optical system 2. Since the etalon 1 has spectral transmittance characteristics such that transmittance varies with wavelength periodically as shown in FIG. 4, if light from the object under observation incident on the etalon 1 has characteristics as shown by the shading in FIG. 8, the light from the object under observation is converted into light having a plurality of peak wavelengths as shown by the shading in FIG. 9.

As stated above, in the etalon 1 used in the spectral imaging apparatus of the present invention, a free spectral range in the spectral transmittance characteristics is determined in accordance with the surface interval between the reflecting coats 1b. That is, peak wavelengths of light as converted by the etalon 1 also are changed in accordance with the surface interval between the reflecting coats 1b. Therefore, the light having the peak wavelengths shown in FIG. 9 is a mere example of light converted by the etalon 1.

The light converted by the etalon 1 is incident on the dichroic mirror 3a of the light extracting means 3. The dichroic mirror 3a has, as stated above, transmittance characteristics as shown in FIG. 5. Therefore, out of light incident on the dichroic mirror 3a, light in a wavelength band (approximately 490 nm or longer) containing light for imaging is transmitted to be emergent toward the image sensor 5, and light in the other wavelength band (approximately 490 nm or shorter) is reflected to be emergent toward the detector 8.

The light transmitted through the dichroic mirror 3a is incident on the filter 3b for imaging of the light extracting means 3. As stated above, the filter 3b for imaging as a whole has the transmittance characteristics as shown in FIG. 6C. Therefore, the light transmitted through and emergent from the filter 3b for imaging has characteristics as shown by the shading in FIG. 10.

Then, the light transmitted through the filter 3b for imaging forms an image on the image pickup surface of the image sensor 5 via the image forming optical system 4. As a result, in the spectral imaging apparatus of the present invention, an image formed of light in which intensity of only a predetermined wavelength is high is captured. Therefore, in the spectral imaging apparatus of the present invention, by capturing images of the identical observation range while changing the spectral transmittance characteristics of the etalon 1, it is possible to measure which part in the observation range emits which light.

On the other hand, the light reflected by the dichroic mirror 3a is incident on the filter 3c for calibration of the light extracting means 3. As stated above, the filter 3c for calibration as a whole has the transmittance characteristics as shown in FIG. 7C. Therefore, the light transmitted through and emergent from the filter 3c for calibration has characteristics as shown by the shading in FIG. 11.

Then, the light transmitted through the filter 3c for calibration is incident on the detector 8 via the condenser optical system 6 and the light guide fiber 7. As a result, in the spectral imaging apparatus of the present invention, the peak wavelength existing in the wavelength band not including light that forms an image is detected at the detector 8.

Next, the explanation is made, in reference to FIG. 1, FIG. 13 and FIG. 14, on the adjusting method of the spectral characteristics variable element of the spectral imaging apparatus of this embodiment and its procedure.

For example, suppose that a measurement is to be made using the spectral imaging apparatus of this embodiment to determine from which part of the object under observation light in a wavelength band, as shown in FIG. 3, of a certain width with a wavelength $\lambda_0$ (555 nm) at its center emerges. In this situation, first, when the user inputs the designated wavelength (command wavelength $\lambda_0$) into the control means 9 (Step 1), the operation processing section 9a of the control means 9 acquires, from a lookup table provided inside itself, a sensor output value (command voltage $V_0$) corresponding to the command wavelength $\lambda_0$ (Step 2) and send it to the drive processing section 9b.

After that, the drive means 9b acquires an output value $V_s$ of the capacitive sensors included in the etalon 1 (Step 3). Then, the drive means 9b compares the command voltage $V_0$ and the output value $V_s$ of the capacitive sensors (Step 4), and varies the surface interval between the reflecting coats of the etalon 1 until these values coincide with each other (Step 5). When the command voltage $V_0$ and the output value $V_s$ of the capacitive sensors comes to be equal, the detector 8 detects the peak wavelength $\lambda_{m+1}$ on the shorter-wavelength side from the light for calibration that is incident thereon at this instant (Step 6).

As stated above, a free spectral range, which is an interval between wavelengths at which transmittance of the etalon 1 takes peak values, can be calculated from the surface interval between the pair of reflecting coats 1b. Therefore, from the wavelength $\lambda_{m+1}$ at which the transmittance of the etalon 1 takes a peak value on the shorter-wavelength side and the surface interval between the pair of reflecting coats 1b, the wavelength $\lambda_m$ at which the transmittance of the etalon 1 takes a peak value on the longer-wavelength side can be calculated. In other words, without directly using the light for imaging, it is possible to calculate the peak wavelength $\lambda_m$ of light for imaging from the peak wavelength $\lambda_{m+1}$ of light for calibration.

Then, the operation processing section 9a of the control means 9 calculates the surface interval between the pair of reflecting coats 1b of the etalon 1 from the value $V_s$ acquired from the capacitive sensors of the etalon 1, and calculates, from the surface interval thus calculated and the peak wavelength $\lambda_{m+1}$ acquired by the detector 8, the peak wavelength $\lambda_m$ contained in the light for imaging (Step 7). Here, the relation between the peak wavelength $\lambda_{m+1}$ acquired by the detector 8 and the peak wavelength $\lambda_m$ contained in the light for imaging is expressed by the following equation:

$$\lambda_m = \frac{m+1}{m} * \lambda_{m+1}$$

After that, the operation processing section 9a compares the value of the wavelength $\lambda_m$ as calculated with the command wavelength $\lambda_0$ (Step 8).

If the peak wavelength $\lambda_m$ of the light for imaging and the command wavelength $\lambda_0$ designated by the user coincide with each other, the intensity of light to form an image is sufficiently high as shown by the shading in FIG. 14A, to enable image capture with a sufficient amount of light. That is, it is possible to obtain a spectral image of the object surface at a target wavelength. Therefore, if wavelength scanning is repeatedly made while changing the command wavelength $\lambda_0$, spectral components contained in the object under observation can be accurately extracted.

Then, if the value of the wavelength $\lambda_m$ and the value of the command wavelength $\lambda_0$ coincide with each other, an image is displayed on the image display means now shown (Step 9). On the other hand, if the peak wavelength $\lambda_m$ of the light for imaging greatly deviates from the command wavelength $\lambda_0$ designated by the user, the intensity of light to form an image is too poor in reference to the case where the wavelength $\lambda_m$ and the wavelength $\lambda_0$ coincide, to obstruct the image capture with a sufficient amount of light. That is, it is impossible to obtain a spectral image of the object surface at a target wavelength. Therefore, even if wavelength scanning is repeatedly made while changing the command wavelength $\lambda_0$, spectral components contained in the object under observation cannot be accurately extracted. In order to perform image capture with a sufficient amount of light, it is necessary to adjust the etalon 1 so that the peak wavelength $\lambda_m$ of light for imaging, or the wavelength $\lambda_m$ at which the transmittance of the etalon 1 takes a peak value in the longer-wavelength side coincides with the command wavelength $\lambda_0$ designated by the user.

Thus, if a value of the wavelength $\lambda_m$ does not coincide with a value of the command wavelength $\lambda_0$, the control means 9 changes the lookup table with respect to the command wavelength $\lambda_0$ and the corresponding sensor output value (command voltage $V_0$) (Step 10). Then, the processing from Step 2 through Step 8 is repeated performed until a value of the wavelength $\lambda_m$ as calculated coincides with the command wavelength $\lambda_0$.

In this way, in the spectral imaging apparatus of the present invention, an adjustment of the spectral transmittance variable element can be made at any time during the image capture process as desired by the user. According to this adjustment method, since there is no time lag between a calibration necessary for adjustment and an image observation, a highly precise adjustment can be made.

Also, since the spectral imaging apparatus of the present invention conducts calibration using the same etalon as used for image observation and using the same path of light as used for image observation, a production error of the etalon itself never affects the calibration.

Also, in the spectral imaging apparatus of this embodiment, after light for imaging and light for calibration are extracted from light converted via a single spectral transmittance variable element, image capture is made using the light for imaging alone as well as adjustment of the spectral transmittance variable element is made using the light for calibration alone. Therefore, the light for calibration can be extracted without decreasing the amount of light for imaging, and accordingly, the image quality of a captured image is not degraded.

Embodiment 2

A spectral imaging apparatus of this embodiment is explained in detail in reference to FIG. 15 through FIG. 21.

Figure 15:
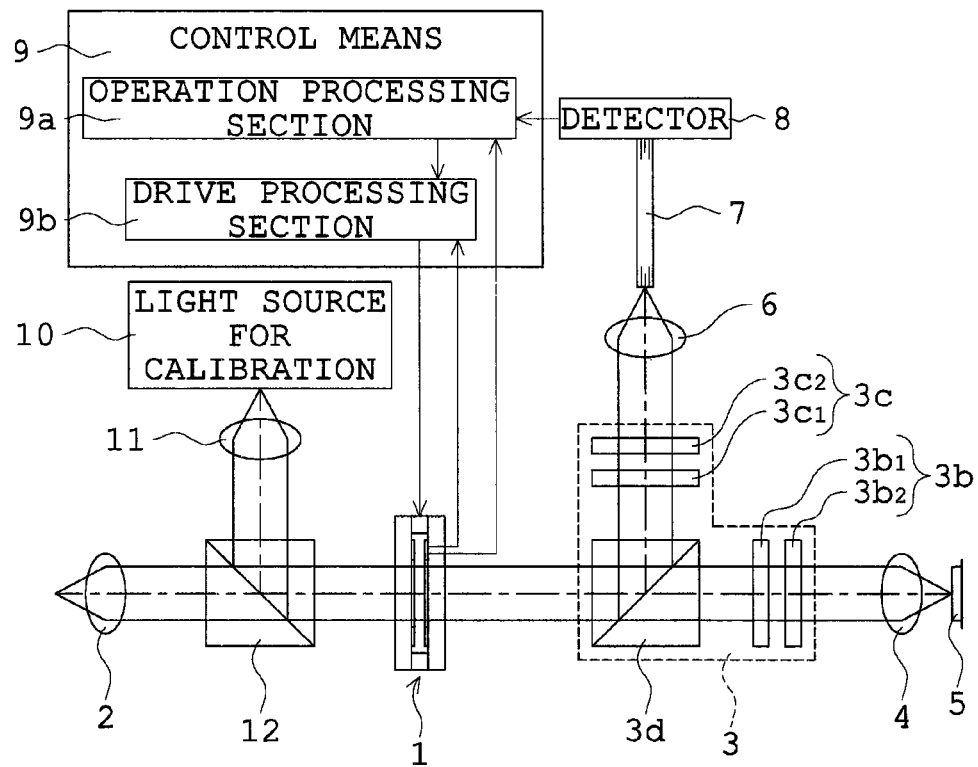
FIG. 15 is a schematic diagram that shows the configuration of a spectral imaging apparatus of Embodiment 2.
Figure 16:
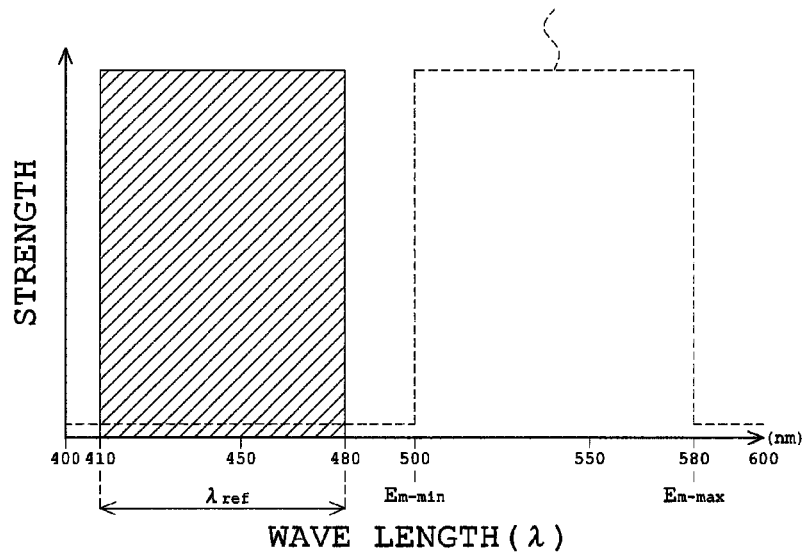
FIG. 16 is a characteristics diagram that shows intensity for wavelength of light emanating from a light source for calibration.
Figure 17:
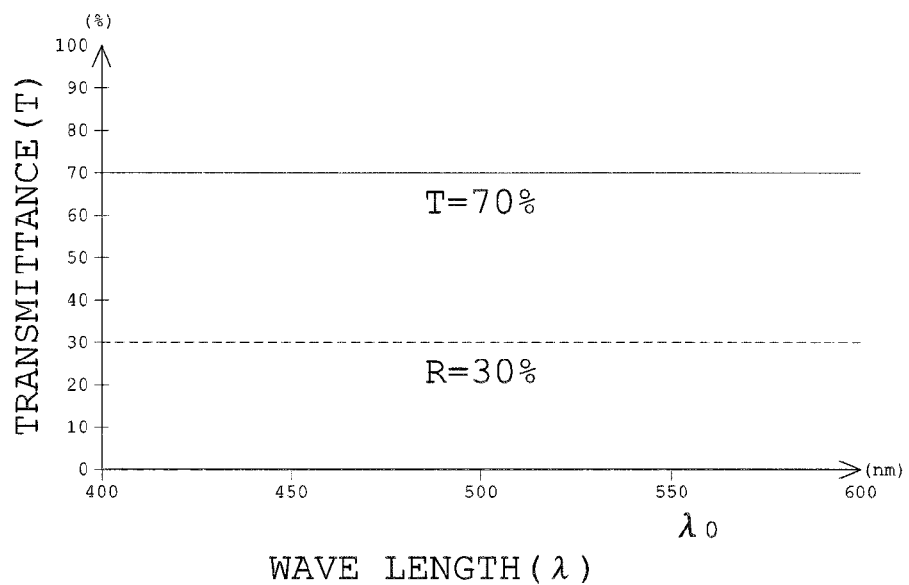
FIG. 17 is a characteristics diagram that shows characteristics on transmittance for wavelength, of a half mirror of a light extracting means included in the spectral imaging apparatus of FIG. 15.

FIG. 15 is a schematic diagram that shows the configuration of the spectral imaging apparatus of this embodiment. FIG. 16 is a characteristics diagram that shows intensity for wavelength of light emanating from a light source for calibration. FIG. 17 is a characteristics diagram that shows characteristics on transmittance for wavelength, of a half mirror of a light extracting means included in the spectral imaging apparatus of FIG. 15.

Figure 18:
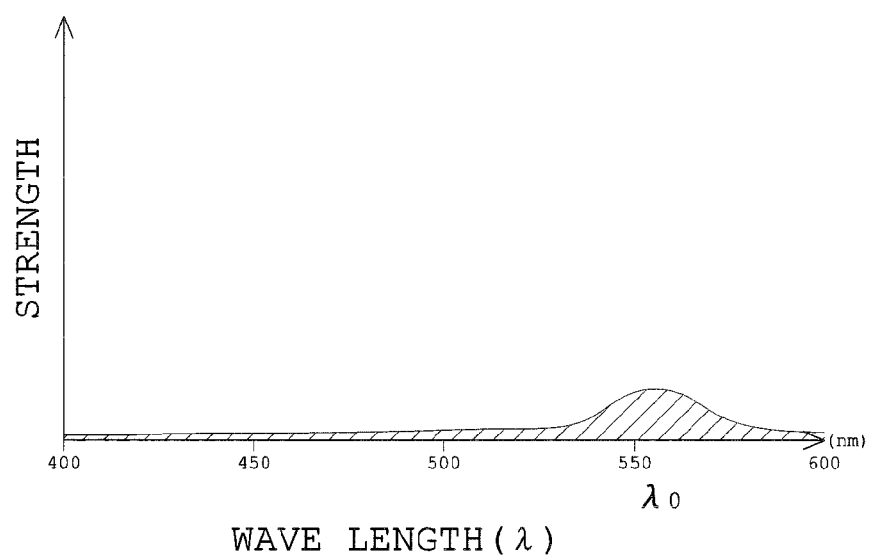
FIG. 18 is a characteristics diagram that shows intensity for wavelength of light incident on an etalon of the spectral imaging apparatus of FIG. 15 in the state where the light source for calibration does not emit light.
Figure 19A:
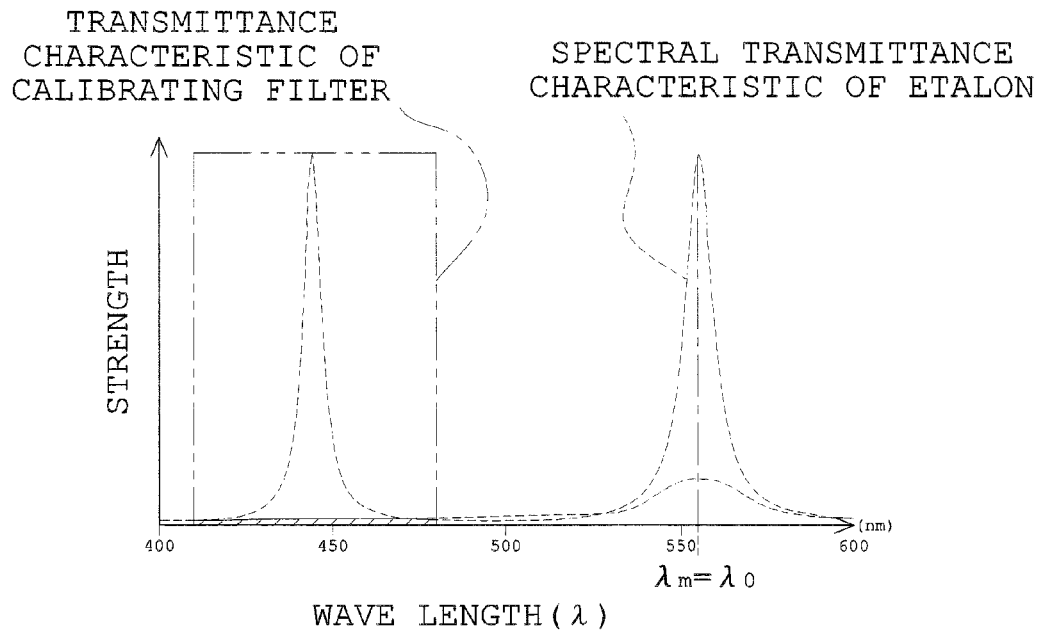
FIGS. 19A and 19B are characteristics diagrams that show intensity for wavelength of light reaching a detector in the situation where light having the characteristics shown in FIG. 18 enters the spectral imaging apparatus of FIG. 15 in the state where the light source for calibration does not emit light, specifically showing the case where the peak wavelength of light converted by the etalon and the command wavelength designated by the user coincide with each other, and the case where they do not, respectively.
Figure 19B:
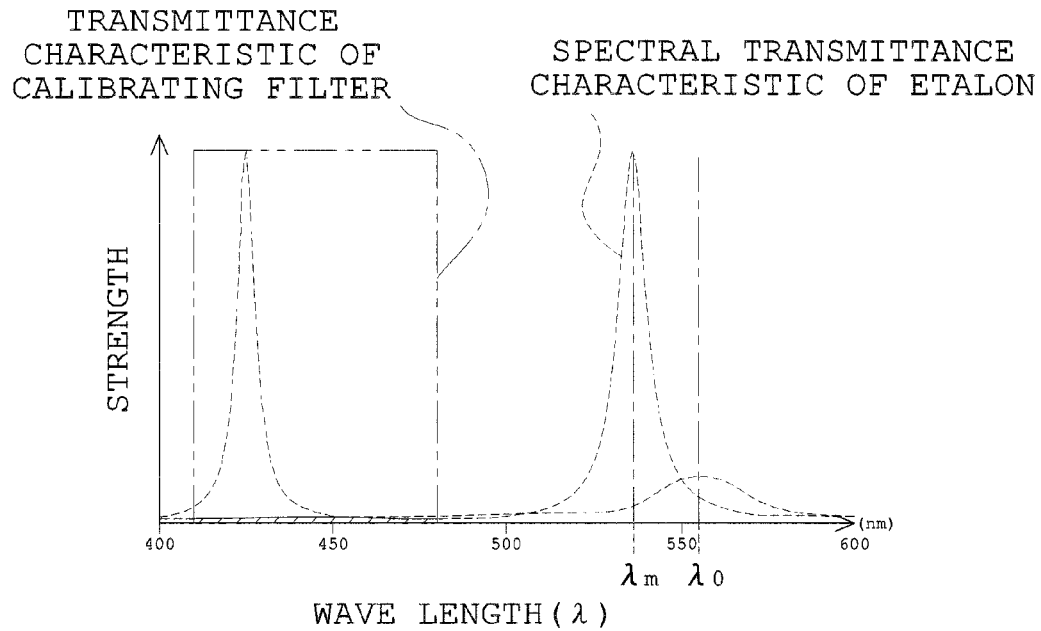
Figure 20:
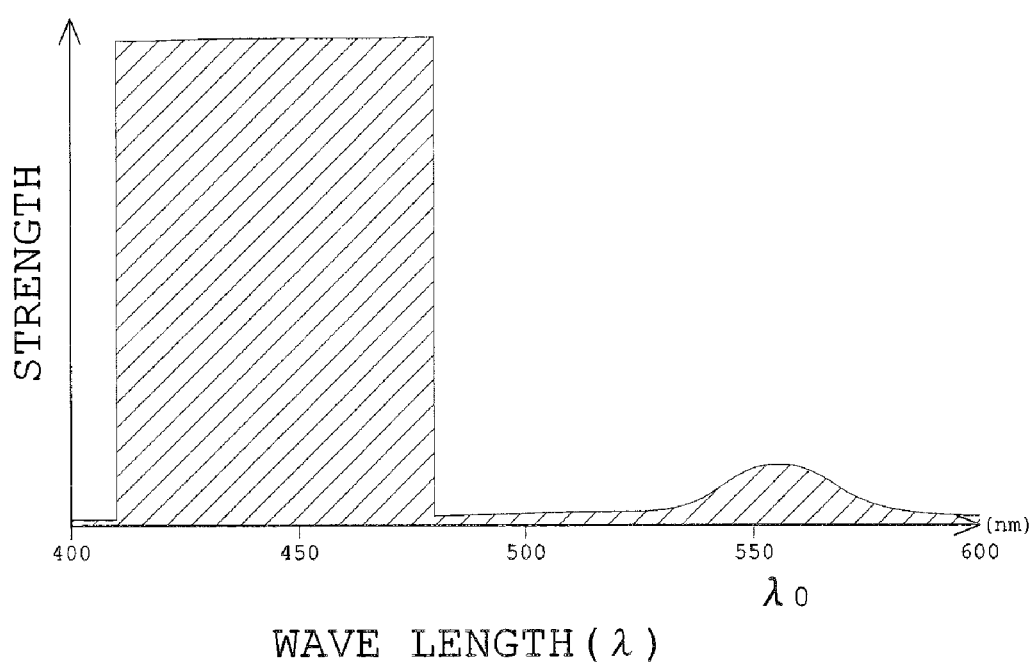
FIG. 20 is a characteristics diagram that shows intensity for wavelength of light incident on the etalon of the spectral imaging apparatus of FIG. 15 in the state where the light source for calibration emits light.
Figure 21A:
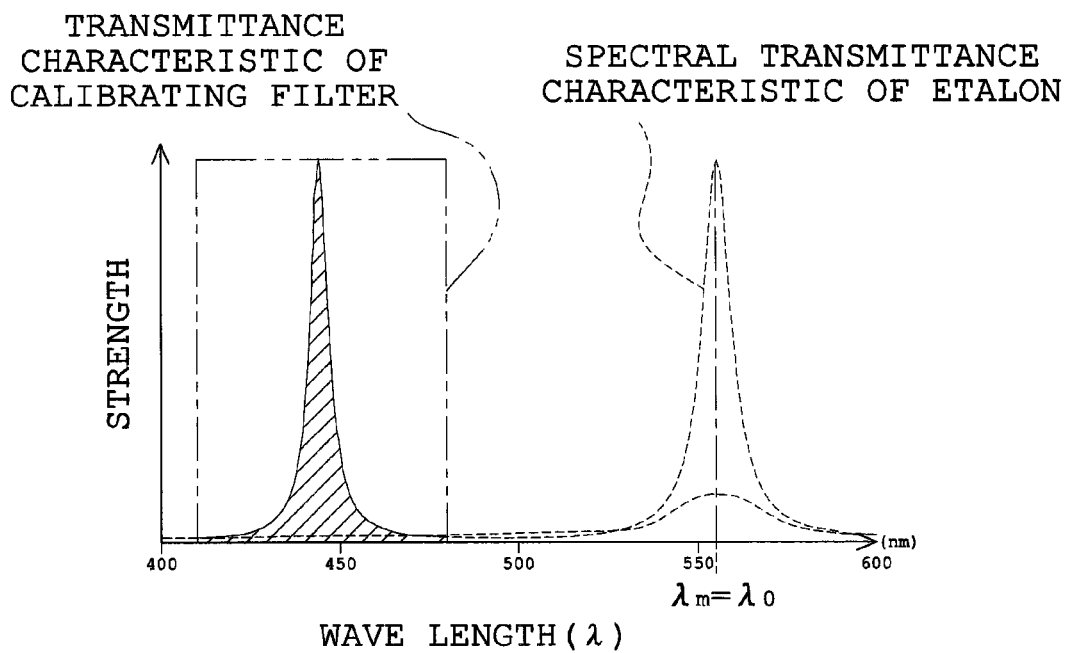
FIGS. 21A and 21B are characteristics diagrams that show intensity for wavelength of light reaching the detector in the situation where light having the characteristics shown in FIG. 20 enters the spectral imaging apparatus of FIG. 15 in the state where the light source for calibration does not emit light, specifically showing the case where the peak wavelength of light converted by the etalon and the command wavelength designated by the user coincide with each other, and the case where they do not, respectively.
Figure 21B:
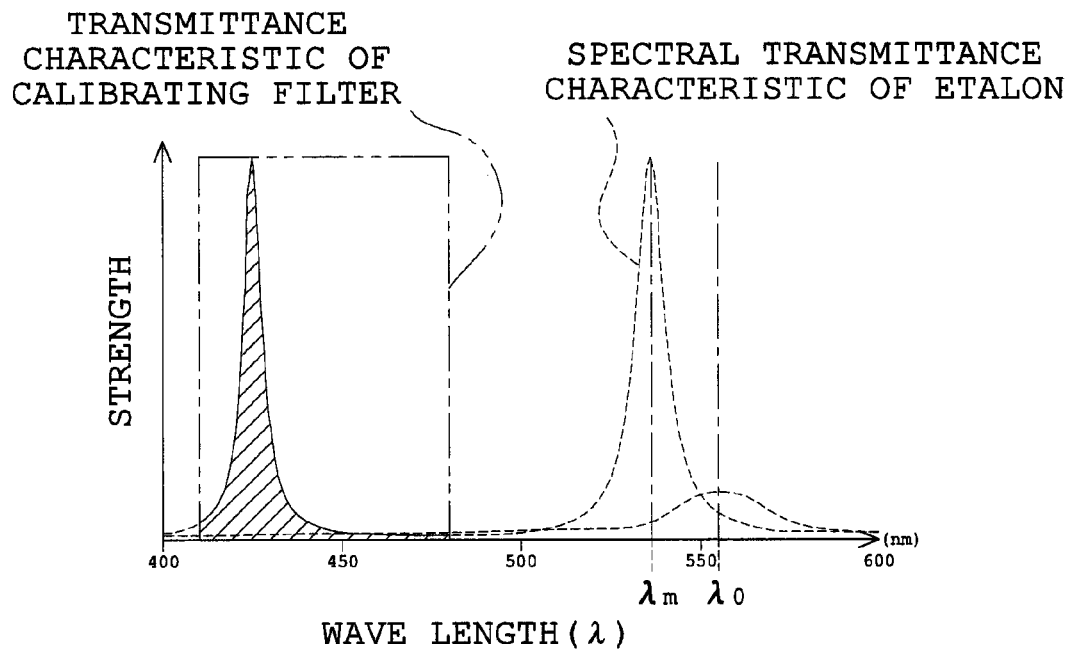

FIG. 18 is a characteristics diagram that shows intensity for wavelength of light incident on an etalon of the spectral imaging apparatus of FIG. 15 in the state where the light source for calibration does not emit light. FIG. 19 are characteristics diagrams that show intensity for wavelength of light reaching a detector in the situation where light having the characteristics shown in FIG. 18 enters the spectral imaging apparatus of FIG. 15 in the state where the light source for calibration does not emit light, where FIG. 19A shows the case where the peak wavelength of light converted by the etalon and the command wavelength designated by the user coincide with each other, and FIG. 19B shows the case where they do not. FIG. 20 is a characteristics diagram that shows intensity for wavelength of light incident on the etalon of the spectral imaging apparatus of FIG. 15 in the state where the light source for calibration emits light. FIG. 21 are characteristics diagrams that show intensity for wavelength of light reaching the detector in the situation where light having the characteristics shown in FIG. 20 enters the spectral imaging apparatus of FIG. 15 in the state where the light source for calibration does not emit light, where FIG. 21A shows the case where the peak wavelength of light converted by the etalon and the command wavelength designated by the user coincide with each other, and FIG. 21B shows the case where they do not.

It is noted that, in the spectral imaging apparatus of this embodiment, members having substantially the same structures and functions as those of the spectral imaging apparatus of Embodiment 1 are labeled with the same reference symbols, and detailed explanations on these members are omitted.

First, the configuration of the spectral imaging apparatus of this embodiment is explained in reference to FIG. 15 through FIG. 17. The spectral imaging apparatus of this embodiment is formed of the configuration of the spectral imaging apparatus of Embodiment 1, with a light source 10 for calibration, an illumination optical system 11 for calibration light, and a half mirror 12 as a path combining means being added thereto. In addition, not like the light extracting means 3 of the spectral imaging apparatus of Embodiment 1, a half mirror 3d is provided in place of the dichroic mirror 3a.

The light source 10 for calibration is arranged inside the spectral imaging apparatus. Light emanating from the light source 10 for calibration has characteristics as shown by the shading in FIG. 16, that is, characteristics such as not including light in a wavelength band that can be captured by the spectral imaging apparatus, to be specific, the wavelength band from the rising wavelength ($\lambda_{Em-min}$, approximately 500 nm) to the falling wavelength ($\lambda_{Em-max}$, approximately 580 nm) of the filter 3b for imaging and including light in a wavelength band of approximately 410-480 nm ($\lambda_{ref}$) in which a peak wavelength used for calibration of the etalon 1 possibly exists.

The light source 10 for calibration is configured so that the wavelength band ($\lambda_{ref}$) of light it emits satisfies the following conditions (1) and (2):

$$\lambda_{m+1} - \frac{FWHM_{m+1}}{2} \leq \lambda_{ref} \leq \lambda_{m+1} + \frac{FWHM_{m+1}}{2} \quad (1)$$

$$\lambda_{m+2} < \lambda_{ref} < \lambda_{Em-min} \quad (2)$$

where $$\lambda_{m+1} = \frac{m}{m+1} * \lambda_m$$

$$\lambda_{m+2} = \frac{m}{m+2} * \lambda_m$$

$$FWHM_{m+1} = \frac{\lambda_{m+1}^2}{m * \lambda_m} * \frac{1-R}{\pi\sqrt{R}}$$

$$2nd\cos\theta = m\lambda_m$$

where an ordinal numeral of the peak wavelength of light incident on the image sensor is denoted by m and this wavelength is denoted by $\lambda_m$. R is a reflectance of the surfaces, which face each other, of the pair of substrates, n is a refractive index of a medium between the pair of substrates, d is the surface interval between the pair of substrates, and θ is an angle of incidence of light from the object under observation on the pair of substrates.

If light emanating from the light source 10 for calibration does not include light in the wavelength band specified by Condition (1), the peak wavelength for calibration cannot be detected with a sufficiently high precision. In addition, if the lower limit of Condition (2) is not reached, since a wide wavelength region should be cut off, production of the filters for imaging and the beam splitter is made difficult, to result in an increase in the production cost. On the other hand, if the upper limit of Condition (2) is exceeded, since the light for calibration is included in the wavelength band of the light for imaging, an accurate spectral image cannot be obtained.

The illumination optical system 11 for calibration light is arranged between the light source 10 for calibration and the half mirror 12. Via the illumination optical system 11 for calibration light, light from the light source 10 for calibration is introduced into the half mirror 12. The half mirror 12 is arranged at a position where a path of the light from the light source 10 for calibration as introduced by the illumination optical system 11 for calibration light and a path of light from the object under observation to be introduced to the etalon 1 by the objective optical system 2 intersect. By the half mirror 3d, the light from the light source 10 for calibration is combined with the light from the object under observation.

The half mirror 3d, which is included in the light extracting means 3 in place of the dichroic mirror 3a, has transmittance characteristics as shown in FIG. 7, so that 70% of incident light is transmitted through the half mirror 3d to be emergent toward the image sensor 5, and 30% of the incident light is reflected by the half mirror 3d to be emergent toward the detector 8.

Next, in reference to FIG. 15 through FIG. 20, the explanation is made on light passing the spectral imaging apparatus of this embodiment and its path.

In the spectral imaging apparatus of this embodiment, in the state where the light source for calibration does not emit light, light incident on the etalon 1 comes only from the object under observation.

Here, if the light from the object under observation merely has a very low intensity as shown by the shading in FIG. 18, light that reaches the detector 8 merely has a very low intensity as shown by the shading in FIG. 19A even in the case where the command wavelength $\lambda_0$ designated by the user coincides with the wavelength $\lambda_m$ at which transmittance of the etalon 1 has a peak value. Further, if the command wavelength $\lambda_0$ designated by the user does not coincide with the wavelength $\lambda_m$ at which transmittance of the etalon 1 has a peak value, light that reaches the detector has a yet lower intensity, as shown by the shading in FIG. 19B, than in the case where these wavelengths coincide with each other.

As a result, calibration and adjustment of the etalon 1 cannot be sufficiently made, to preclude accurate measurement and image observation. However, even in the case where the light from the object under observation merely has a very low intensity as shown by the shading in FIG. 18, light incident on the etalon 1 has characteristics as shown by the shading in FIG. 20 in the condition where the light source 10 for calibration emits light. Therefore, in the state where the light source 10 for calibration emits light, light that reaches the detector 8 has a high intensity for a particular peak wavelength as shown by the shadings in FIG. 21A and FIG. 21B irrespective of whether or not the command wavelength $\lambda_0$ designated by the user coincides with the wavelength $\lambda_m$ at which transmittance of the etalon 1 has a peak value. As a result, irrespective of intensity of light from the object under observation, calibration and adjustment of the etalon 1 can be sufficiently made, to facilitate accurate measurement and image observation.

In the spectral imaging apparatus of this embodiment, in separating the light converted by the etalon 1 into the light for imaging and the light for calibration by the light extracting means 3, while the half mirror 3d of the light extracting means 3 directs 70% light out of the incident light to be emergent toward the image sensor 5, it directs only 30% light to be emergent toward the detector 8.

However, in the spectral imaging apparatus of this embodiment, in the state where the light source for calibration emits light in a wavelength band in which a peak wavelength of light for calibration possibly exists, even 30% out of light emergent from the etalon 1 is sufficient for detection of the peak wavelength. As a result, in the spectral imaging apparatus of this embodiment, calibration and adjustment of the etalon 1 can be made with high precision irrespective of intensity of light from the object under observation.

On the other hand, since 70% out of the incident light is available for imaging, feeble light from the object under observation, which is primarily intended to be measured, can be sufficiently picked up while calibration is conducted. This ratio is not limited to the very value, and thus may be appropriately changed in accordance with amount of light from the object under observation and from the light source for calibration.

The light source 10 for calibration of the spectral imaging apparatus of this embodiment is configured to radiate light in a fixed wavelength band. However, the configuration may be made so that the wavelength band of light radiated from the light source 10 for calibration is automatically changed by the control means 9 in accordance with the command wavelength designated by the user and the peak wavelength detected by the detector.

Since the image formation conducted thereafter and the adjustment method and its procedure of the etalon 1 are similar to those in the spectral imaging apparatus of Embodiment 1, detailed explanations on them are omitted.

Embodiment 3

Figure 22:
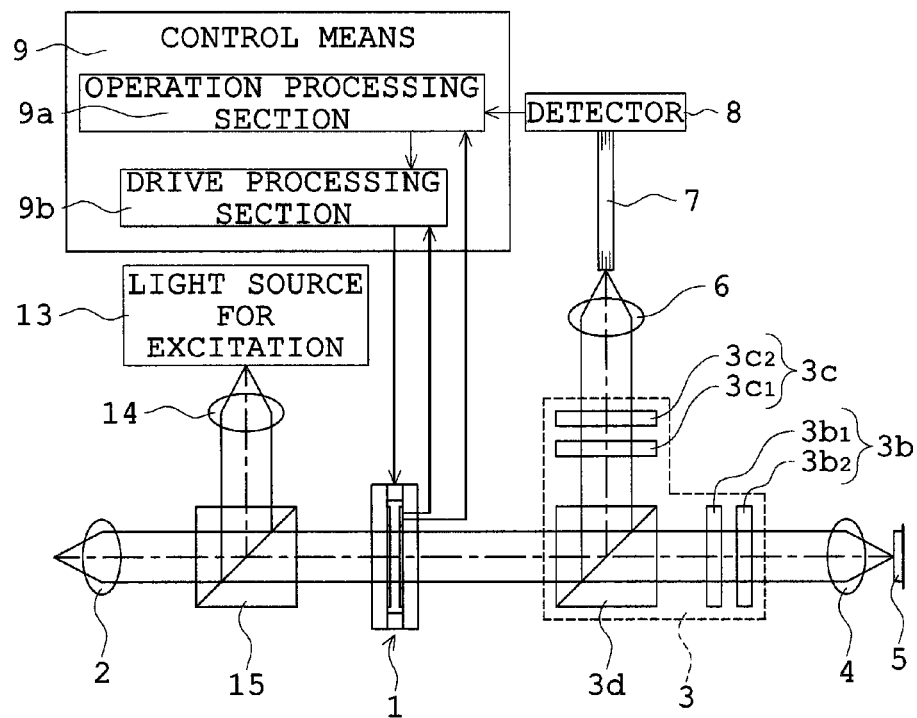
FIG. 22 is a schematic diagram that shows the configuration of a spectral imaging apparatus of Embodiment 3.

A spectral imaging apparatus of this embodiment is explained in detail in reference to FIG. 22. FIG. 22 is a schematic diagram that shows the configuration of the spectral imaging apparatus of this embodiment.

In the spectral imaging apparatus of this embodiment, members having substantially the same structures and functions as those of the spectral imaging apparatuses of the preceding embodiments are labeled with the same reference symbols, and detailed explanations on these members are omitted.

The spectral imaging apparatus of this embodiment is formed of the spectral imaging apparatus of Embodiment 1, with a light source 13 for excitation, an exciting-light optical system 14, and a half mirror 15 as a path combining means being added thereto. In addition, like the light extracting means 3 of the spectral imaging apparatus of Embodiment 2, a half mirror 3d is provided in place of the dichroic mirror 3a.

The exiting-light optical system 14 is arranged between the light source 13 for excitation and the half mirror 15. Via the exciting-light optical system 14, light from the light source 13 for excitation is introduced into the half mirror 15. The half mirror 15 is arranged at a position where a path of the light from the light source 13 for excitation as introduced by the exciting-light optical system 14 and a path of light from the object under observation to be introduced to the etalon 1 by the objective optical system 2 intersect. The light emitted from the light source 13 for excitation is light in a wavelength band different from those of light emitted from the light source 10 for calibration and of light for imaging.

First, the light from the light source 13 for excitation is reflected at the half mirror 15 toward the objective optical system 2, and then is thrown on the object under observation via the objective optical system 2. Then, fluorescence generated from the object under observation as a result of irradiation with the exciting light is incident on the objective optical system 2, and then is transmitted through the half mirror, to be incident on the etalon 1. Since the image formation conducted thereafter and the adjustment method and its procedure of the etalon 1 are similar to those in the spectral imaging apparatus of Embodiment 2, detailed explanations on them are omitted.

Since the spectral imaging apparatus of this embodiment is thus configured, it can preferably acquire spectral images with respect to fluorescence as a result of excitation by exiting light, also.

Embodiment 4

Figure 23:
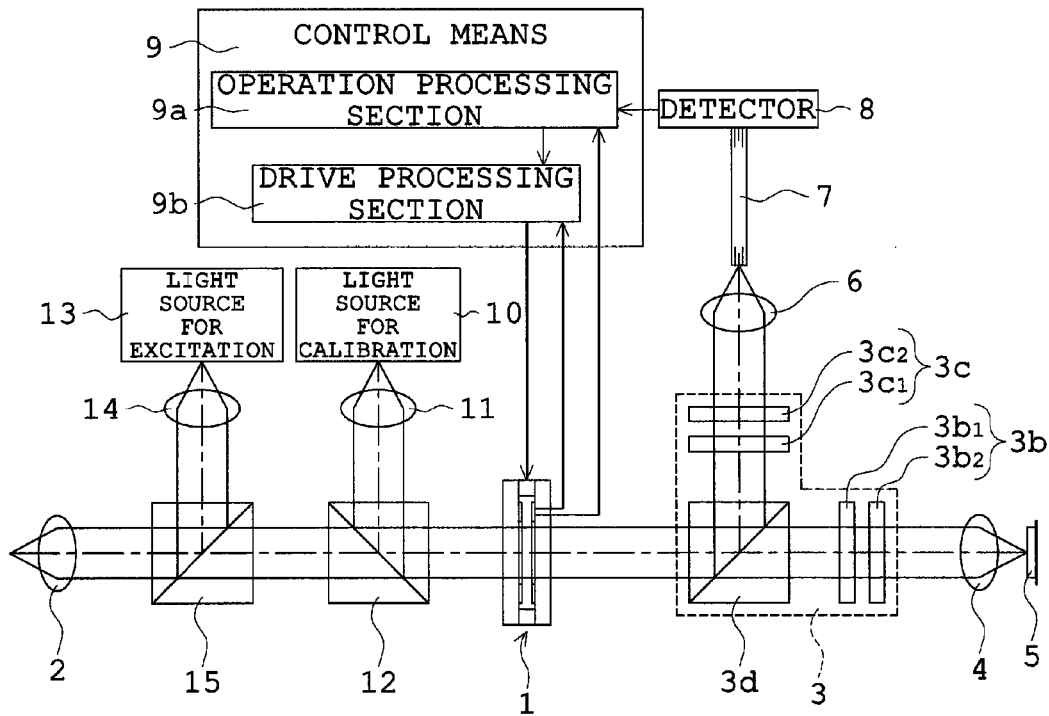
FIG. 23 is a schematic diagram that shows the configuration of a spectral imaging apparatus of Embodiment 4.

A spectral imaging apparatus of this embodiment is explained in detail in reference to FIG. 23. FIG. 23 is a schematic diagram that shows the configuration of the spectral imaging apparatus of this embodiment.

In the spectral imaging apparatus of this embodiment, members having substantially the same structures and functions as those of the spectral imaging apparatuses of the preceding embodiments are labeled with the same reference symbols, and detailed explanations on these members are omitted.

The spectral imaging apparatus of this embodiment is provided with substantially the same configuration as the spectral imaging apparatus of Embodiment 2, but is provided with a light source 13 for excitation, a exciting-light optical system 14, and a half mirror 15 as a path combining means, which are similar to those in the spectral imaging apparatus of Embodiment 3. Since the other configurations and a method of calibration and adjustment of the etalon 1 are similar to those of the spectral imaging apparatuses of the other embodiments, detailed explanations on them are omitted.

Embodiment 5

Figure 24:
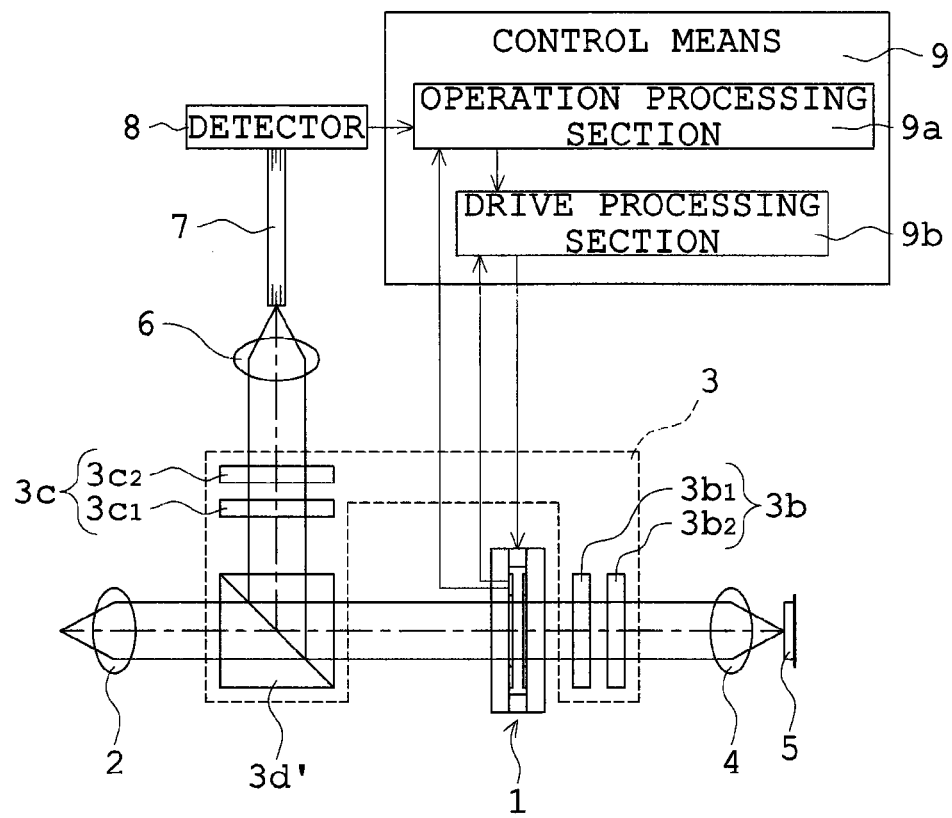
FIG. 24 is a schematic diagram that shows the configuration of a spectral imaging apparatus of Embodiment 5.
Figure 25:
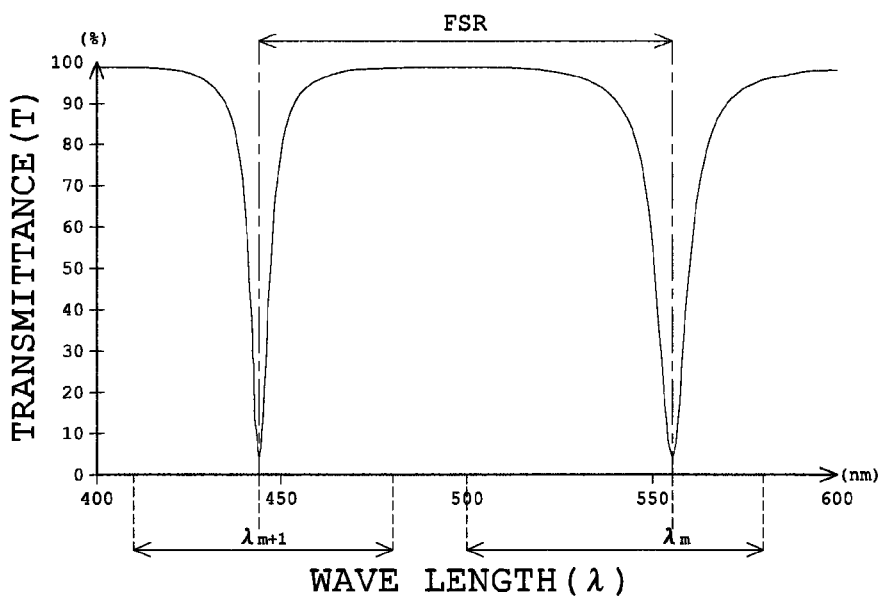
FIG. 25 is a characteristics diagram that shows intensity for wavelength of light converted as reflected by an etalon.

A spectral imaging apparatus of this embodiment is explained in detail in reference to FIG. 24 and FIG. 25.

FIG. 24 is a schematic diagram that shows the configuration of the spectral imaging apparatus of this embodiment. FIG. 25 is a characteristics diagram that shows intensity for wavelength of light converted as reflected by an etalon.

In the spectral imaging apparatus of this embodiment, members having substantially the same structures and functions as those of the spectral imaging apparatuses of Embodiment 1 and Embodiment 2 are labeled with the same reference symbols, and detailed explanations on these members are omitted.

The spectral imaging apparatus of this embodiment is provided with substantially the same configuration as the spectral imaging apparatus of Embodiment 1, but differs from the spectral imaging apparatus of Embodiment 1 in configuration of the light extracting means.

In the spectral imaging apparatus of this embodiment, the light extracting means 3 is configured of a filter 3b for imaging arranged on the image side of the etalon 1, a half mirror 3d' arranged on the object side of the etalon 1, and a filter 3c for calibration arranged between the half mirror 3d' and the condenser optical system 6. The half mirror 3d' has characteristics such as to transmit light from the side of the object under observation and to reflect light from the side of the etalon 1 toward the detector 8.

As described above, the etalon 1 included in the spectral imaging apparatus of this embodiment converts light, as it is transmitted through it, into light having characteristics as shown in FIG. 4. In this occasion, light reflected from the etalon 1 is converted into light having characteristics as shown in FIG. 25. In this embodiment, the peak wavelength of light for calibration is detected using this reflected light.

Since the other configurations and a method of calibration and adjustment of the etalon 1 are similar to those of the spectral imaging apparatuses of the other embodiments, detailed explanations on them are omitted.

Since the spectral imaging apparatus of this embodiment is thus configured, its structure can be simplified upon dispensing with a beam splitter arranged between the etalon 1 and the image sensor 5, to make it possible to increase the arrangement flexibility of the filters $3b_1$ and $3b_2$ for imaging and the design flexibility of the image forming optical system 4.

Embodiment 6

Figure 26:
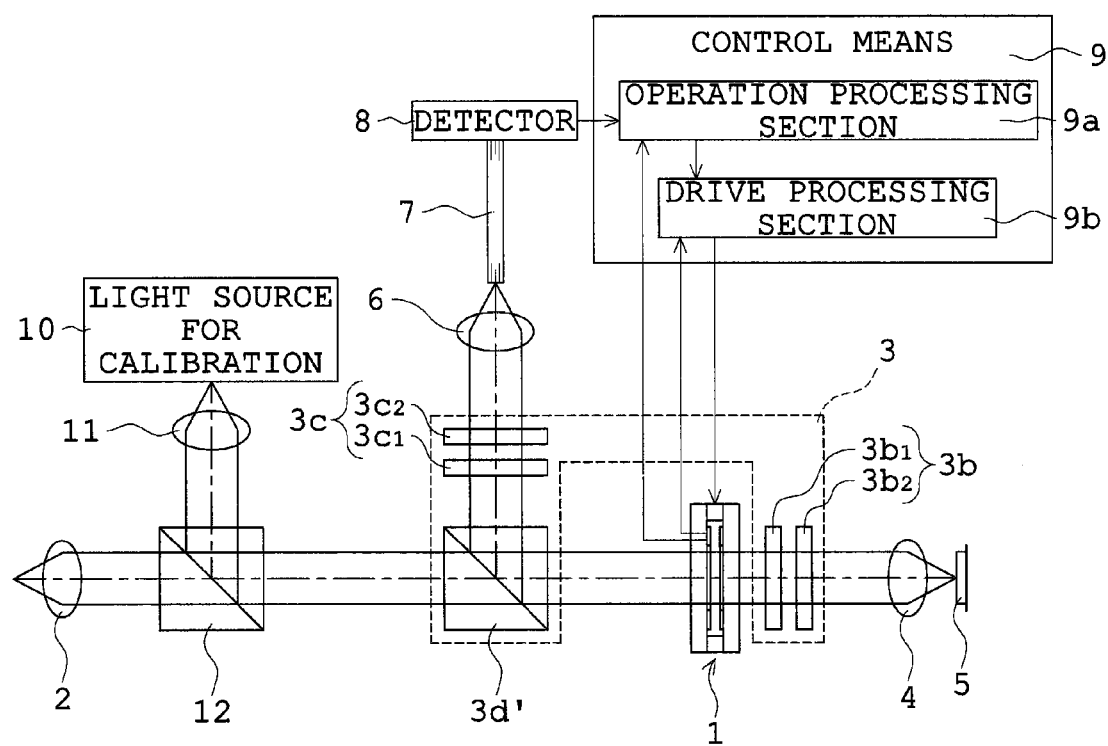
FIG. 26 is a schematic diagram that shows the configuration of a spectral imaging apparatus of Embodiment 6.

A spectral imaging apparatus of this embodiment is explained in detail in reference to FIG. 26.

FIG. 26 is a schematic diagram that shows the configuration of the spectral imaging apparatus of this embodiment.

In the spectral imaging apparatus of this embodiment, members having substantially the same structures and functions as those of the spectral imaging apparatuses of the preceding embodiments are labeled with the same reference symbols, and detailed explanations on these members are omitted.

The spectral imaging apparatus of this embodiment is provided with substantially the same configuration as the spectral imaging apparatus of Embodiment 2, except that the configuration of the light extracting means is different from that of the spectral imaging apparatus of Embodiment 2 and similar to that of the spectral imaging apparatus of Embodiment 5.

Since the other configurations and a method of calibration and adjustment of the etalon 1 are similar to those of the spectral imaging apparatuses of the other embodiments, detailed explanations on them are omitted.

Embodiment 7

Figure 27:
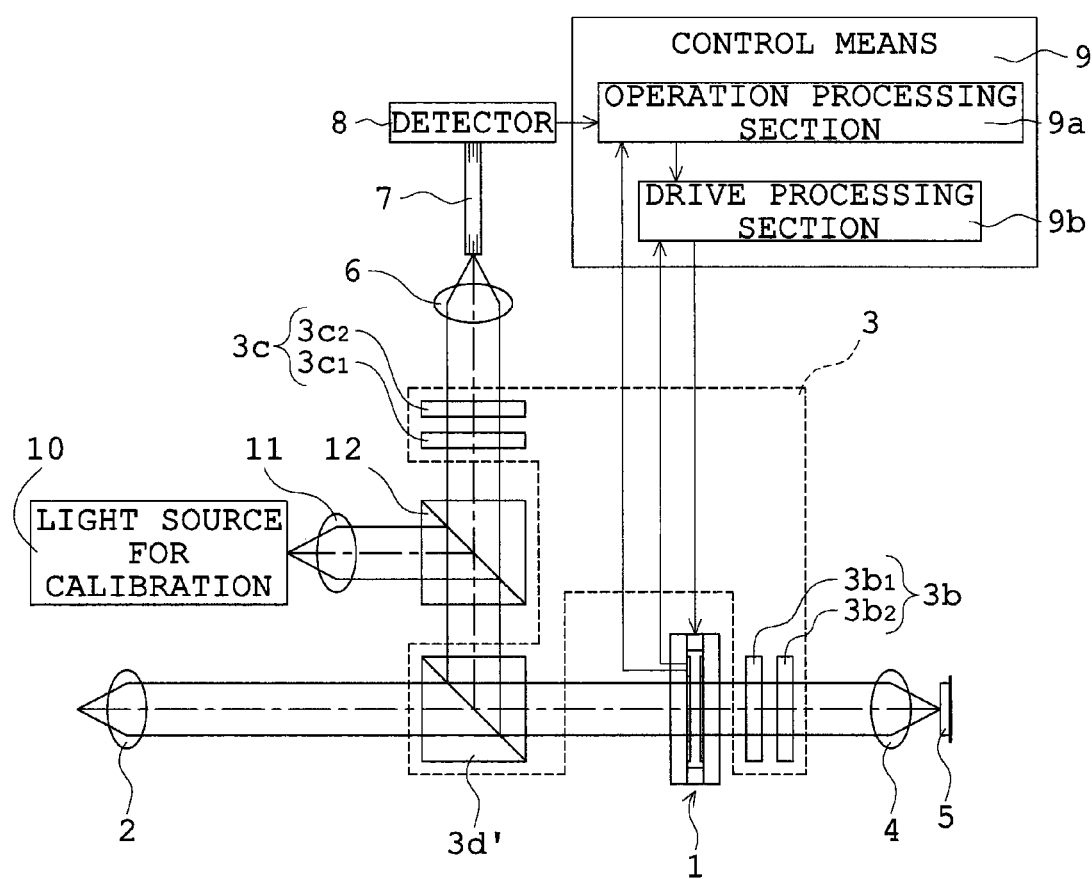
FIG. 27 is a schematic diagram that shows the configuration of a spectral imaging apparatus of Embodiment 7.

A spectral imaging apparatus of this embodiment is explained in detail in reference to FIG. 27.

FIG. 27 is a schematic diagram that shows the configuration of the spectral imaging apparatus of this embodiment.

In the spectral imaging apparatus of this embodiment, members having substantially the same structures and functions as those of the spectral imaging apparatuses of the preceding embodiments are labeled with the same reference symbols, and detailed explanations on these members are omitted.

The spectral imaging apparatus of this embodiment is provided with substantially the same configuration as the spectral imaging apparatus of Embodiment 6, but is different from the spectral imaging apparatus of Embodiment 6 in positions where the light source 10 for calibration, the illumination optical system 11 for calibration light, and the half mirror 12 as a path combining means are arranged. To be specific, the half mirror 12 is arranged between the half mirror 3d', which is arranged between the objective optical system 2 and the etalon 1, and the filter 3c for calibration. The illumination optical system 11 for calibration light is arranged such as to introduce light from the light source 10 for calibration to the half mirror 12 arranged in this way.

In the spectral imaging apparatus of this embodiment, since the light source 10 for calibration, the illumination optical system 11 for calibration light, and the half mirror 12 as a path combining means are arranged at such positions, light from the light source 10 for calibration is first reflected toward the half mirror 3d' by the half mirror 12, and then is introduced to the etalon 1 by the half mirror 3d' as being combined with light from the object under observation. The light reflected by the etalon 1 is reflected by the half mirror 3d' toward the half mirror 12, and then is transmitted through the half mirror, to be introduced to the detector 8 via the filter 3c for calibration, the condenser optical system 6 and the light guide fiber 7.

Since the other configurations and a method of calibration and adjustment of the etalon 1 are similar to those of the spectral imaging apparatuses of the other embodiments, detailed explanations on them are omitted.

Since the spectral imaging apparatus of this embodiment is thus configured, the number of half mirrors to be arranged between the objective optical system and the image forming optical system can be limited to one, to facilitate reduction of the entire length of the apparatus in the direction of the optical axis even though the light source for calibration is arranged.

Embodiment 8

Figure 28:
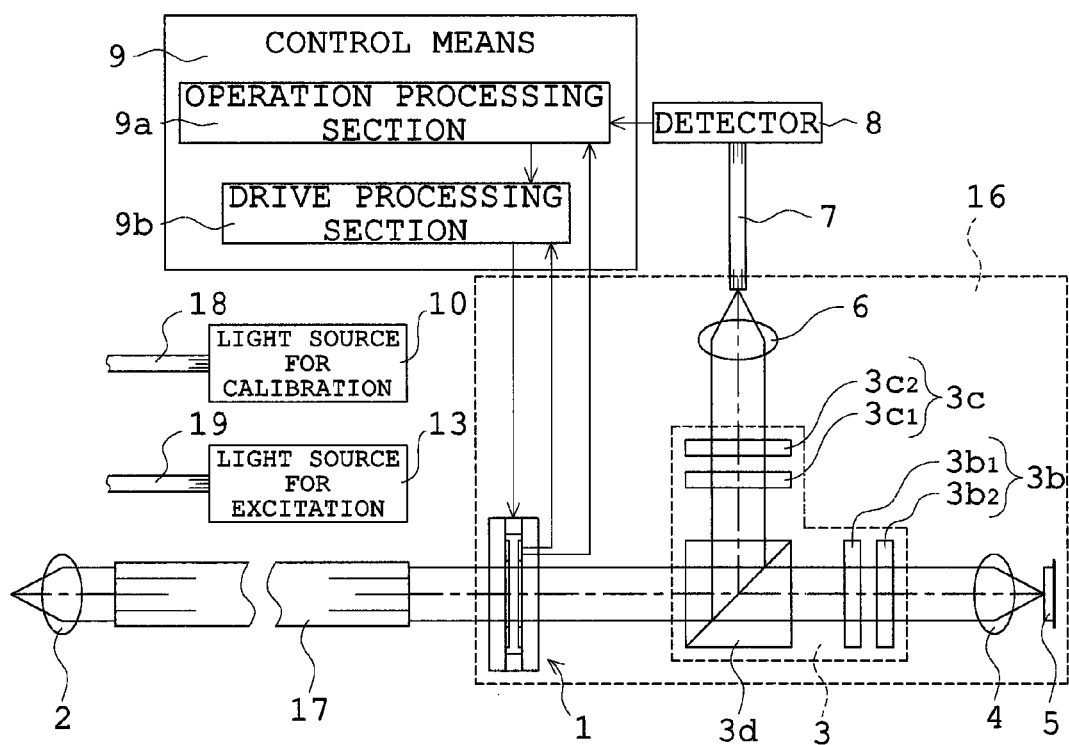
FIG. 28 is a schematic diagram that shows the configuration of a spectral imaging apparatus of Embodiment 8.

A spectral imaging apparatus of this embodiment is explained in detail in reference to FIG. 28.

FIG. 28 is a schematic diagram that shows the configuration of the spectral imaging apparatus of this embodiment.

In the spectral imaging apparatus of this embodiment, members having substantially the same structures and functions as those of the spectral imaging apparatuses of the preceding embodiments are labeled with the same reference symbols, and detailed explanations on these members are omitted.

The spectral imaging apparatus of this embodiment is provided with substantially the same configuration as the spectral imaging apparatus of Embodiment 4, but is different from the spectral imaging apparatus of Embodiment 4 in positions where the objective optical system 2, the light source 10 for calibration, and the light source 13 for excitation are arranged. To be specific, the objective optical system 2, the light source 10 for calibration, and the light source 13 for excitation are arranged outside a main body 16 of the spectral imaging apparatus. Between the objective optical system 2 and the main body 16 of the spectral imaging apparatus, a light guide fiber 17 is arranged. To the light source 10 for calibration, a light guide fiber 18 is connected. In the similar manner, a light guide fiber 19 is connected to the light source 13 for excitation.

In the spectral imaging apparatus of this embodiment thus configured, light from the light source 1 for calibration is thrown on the object under observation via the light guide fiber 18. In the similar manner, light from the light source for excitation is thrown on the object under observation via the light guide fiber 19. The light for calibration reflected from the object under observation and fluorescence generated as a result of irradiation of the object under observation with the exciting light are incident on the objective optical system 2, and is incident on the etalon 1 via the light guide fiber 17.

Since the other configurations and a method of calibration and adjustment of the etalon 1 are similar to those of the spectral imaging apparatuses of the other embodiments, detailed explanations on them are omitted.

Since the exit NA with respect to image forming rays from an endoscope system or a microscope system provided with a fiber scope like the light guide fiber 17 or a rigid scope is about 0.1 at largest, the angle of incidence θ on the etalon is not greater than 6 degrees and the amount of shift of the wavelength $\lambda_m$ affected by the beam-spread angle is not greater than 0.5%, which does not raise a problem in practical use.

Since the spectral imaging apparatus of this embodiment is thus configured, size reduction of the light extracting means, and accordingly the entire apparatus can be achieved. Therefore, application of this embodiment to an endoscope system is preferable.

If the apparatus is configured in this manner, not all of the objective optical system 2, the light source 10 for calibration and the light source 13 for excitation are necessarily arranged outside the spectral imaging apparatus. The configuration may be made so that only some of them is arranged outside.

Furthermore, the present invention is not limited to these examples. Various combinations of the above-explained embodiments are in the scope of the present invention.

In the above-explained embodiments, the peak wavelength ($\lambda_m$) of light for imaging is calculated using a peak wavelength ($\lambda_{m+1}$) that resides on the shorter wavelength side than the former peak wavelength and is adjacent thereto. However, the spectral imaging apparatus of the present invention is not limited to this calculation, but may be configured to perform calculation using light containing a peak wavelength ($\lambda_{m-1}$) that resides on the longer wavelength side than the peak wavelength ($\lambda_m$) of light for imaging and is adjacent thereto. In this case, the relation between the peak wavelength $\lambda_{m-1}$ acquired by the detector and the peak wavelength $\lambda_m$ contained in the light for imaging is expressed by the following equation:

$$\lambda_m = \frac{m-1}{m} * \lambda_{m-1}$$

Also, in this case, it is preferred that the following conditions (1)' and (2)' are satisfied:

$$\lambda_{m-1} - \frac{FWHM_{m-1}}{2} \leq \lambda_{ref} \leq \lambda_{m-1} + \frac{FWHM_{m-1}}{2} \quad (1)'$$

-continued $$\lambda_{Em-max} < \lambda_{ref} < \lambda_{m-2} \quad (2)'$$

where $$\lambda_{m-1} = \frac{m}{m-1} * \lambda_m$$

$$\lambda_{m-2} = \frac{m}{m-2} * \lambda_m$$

$$FWHM_{m-1} = \frac{\lambda_{m-1}^2}{m * \lambda_m} * \frac{1-R}{\pi\sqrt{R}}$$

$$2nd \cos\theta = m\lambda_m$$

where the rising wavelength of the filter for imaging is denoted by $\lambda_{Em-min}$, the falling wavelength of the filter for imaging is denoted by $\lambda_{Em-max}$, and the ordinal numeral of the peak wavelength of light incident on the image sensor is denoted by m and this wavelength is denoted by $\lambda_m$. Also, R is a reflectance of the surfaces, which face each other, of the pair of substrates, n is a refractive index of a medium between the pair of substrates, d is the surface interval between the pair of substrates, and θ is an angle of incidence of light from the object under observation on the pair of substrates.

If light emanating from the light source for calibration does not include light in the wavelength band specified by Condition (1)', the peak wavelength for calibration cannot be detected with a sufficient high precision. In addition, if the lower limit of Condition (2)' is not reached, since the light for calibration is included in the wavelength band of the light for imaging, an accurate spectral image cannot be obtained. On the other hand, if the upper limit of Condition (2)' is exceeded, since a wide wavelength region should be cut off, production of the filters for imaging and the beam splitter is made difficult, to result in an increase in the production cost.

In the spectral imaging apparatus of the present invention, it is not always necessary to perform calculation using a peak wavelength ($\lambda_{m-1}$, $\lambda_{m+1}$) adjacent to the peak wavelength ($\lambda_m$) for imaging. A peak wavelength ( . . . , $\lambda_{m+3}$, $\lambda_{m+2}$, $\lambda_{m-2}$, $\lambda_{m-3}$, . . . ) not adjacent to the peak wavelength ($\lambda_m$) may be used for calculation.

According to the above-explained embodiments, in the adjustment of the spectral transmittance variable element, calibration and adjustment are made using a lookup table that is based on output values of the capacitive sensor. However, the lookup table is not always necessary to be based on output values of the capacitive sensor. A table based on, for example, input voltages of the piezoelectric element may be used. This is because input voltages of the piezoelectric elements also vary in accordance with the surface interval between the pair of optical substrates of the etalon.

Some of the above-explained embodiments fail to provide a light source for excitation. However, the present invention is not limited to such a configuration. A light source for excitation may be provided in any of the embodiments.

What is claimed is:
1. A spectral imaging apparatus comprising:
a spectral transmittance variable element having spectral transmittance characteristics such that a transmittance periodically varies with wavelength and being capable of changing the variation period, for converting light from an object under observation into light having a plurality of peak wavelengths;
a light extracting device for extracting, from the light having a plurality of peak wavelengths, light for imaging that contains a peak wavelength proximate to a predetermined command wavelength designated by a user and light for calibration that contains a peak wavelength other than the peak wavelength proximate to the command wavelength;

an image sensor for capturing an image of the object under observation formed of the light for imaging;

a detector for detecting, from the light for calibration, the peak wavelength other than the peak wavelength proximate to the command wavelength; and a control unit including:

an operation processing section that calculates the peak wavelength that is proximate to the command wavelength and is contained in the light for imaging, from the peak wavelength that is other than the peak wavelength proximate to the command wavelength, is contained in the light for calibration and is detected by the detector, calculates an amount of shift between the peak wavelength proximate to the command wavelength as calculated and the command wavelength, and determines an amount of adjustment of the variation period on a basis of the amount of shift; and a drive processing section that drives the spectral transmittance variable element for changing the variation period.

2. A spectral imaging apparatus according to claim 1, wherein the light extracting device is a dichroic mirror.

3. A spectral imaging apparatus according to claim 1, wherein the light extracting device is configured of a beam splitter arranged in a path of light transmitted through the spectral transmittance variable element, a filter arranged in one of paths of light, as split by the beam splitter, for transmitting only the light for imaging, and a filter arranged in another of the paths of light, as split by the beam splitter, for transmitting only the light for calibration.

4. A spectral imaging apparatus according to claim 1, wherein the light extracting device is configured of a filter arranged on an image-sensor side of the spectral transmittance variable element for transmitting only the light for imaging out of light that is transmitted through the spectral transmittance variable element, a half mirror arranged between the spectral transmittance variable element and the object under observation for transmitting light from the object under observation and for reflecting light that is reflected from the spectral transmittance variable element, and a filter for transmitting only the light for calibration out of light from the half mirror.

5. A spectral imaging apparatus according to claim 1, comprising: a light source for calibration that emits light in a wavelength band including the peak wavelength contained in the light for calibration and not including the peak wavelength contained in the light for imaging; and a path combiner arranged between the object under observation and the spectral transmittance variable element for combining a path of light from the light source for calibration and a path of light from the object under observation.

6. A spectral imaging apparatus according to claim 1, wherein the spectral transmittance variable element includes a pair of substrates arranged to face one another and is capable of changing the variation period of the spectral transmittance characteristics by changing a surface interval between the pair of substrates.

7. A spectral imaging apparatus according to claim 1, wherein the peak wavelength other than the peak wavelength proximate to the command wavelength is a peak wavelength adjacent to the peak wavelength proximate to the command wavelength.

8. A spectral imaging apparatus according to claim 5, wherein the peak wavelength other than the peak wavelength proximate to the command wavelength is a peak wavelength residing adjacent to the peak wavelength proximate to the command wavelength on a shorter wavelength side than the peak wavelength proximate to the command wavelength;

wherein the spectral transmittance variable element includes a pair of substrates arranged to face one another and is capable of changing the variation period of the spectral transmittance characteristics by changing a surface interval between the pair of substrates; and wherein light emanating from the light source for calibration satisfies the following conditions (1) and (2):

$$\lambda_{m+1} - \frac{FWHM_{m+1}}{2} \leq \lambda_{ref} \leq \lambda_{m+1} + \frac{FWHM_{m+1}}{2} \quad (1)$$

$$\lambda_{m+2} < \lambda_{ref} < \lambda_{Em-min} \quad (2)$$

where $$\lambda_{m+1} = \frac{m}{m+1} * \lambda_m$$

$$\lambda_{m+2} = \frac{m}{m+2} * \lambda_m$$

$$FWHM_{m+1} = \frac{\lambda_{m+1}^2}{m * \lambda_m} * \frac{1-R}{\pi \sqrt{R}}$$

$$2nd \cos\theta = m\lambda_m$$

where m is an integer equal to or greater than 1, $\lambda_{ref}$ is the wavelength band of the light source for calibration, $\lambda_m$ is the peak wavelength proximate to the command wavelength, $\lambda_{m+1}$ and $\lambda_{m+2}$ are peak wavelengths other than the peak wavelength proximate to the command wavelength, $\lambda_{Em-min}$ is a shortest wavelength of light incident on the image sensor, $FWHM_{m+1}$ is a full width at half maximum of the peak wavelength $\lambda_{m+1}$, R is a reflectance of surfaces, which face one another, of the pair of substrates, n is a refractive index of a medium between the pair of substrates, d is a surface interval between the pair of substrates, θ is an angle of incidence of light from the object under observation on the pair of substrates.

9. A spectral imaging apparatus according to claim 5, wherein the peak wavelength other than the peak wavelength proximate to the command wavelength is a peak wavelength residing adjacent to the peak wavelength proximate to the command wavelength on a longer wavelength side than the peak wavelength proximate to the command wavelength;

wherein the spectral transmittance variable element includes a pair of substrates arranged to face one another and is capable of changing the variation period of the spectral transmittance characteristics by changing a surface interval between the pair of substrates; and wherein light emanating from the light source for calibration satisfies the following conditions (1) and (2):

$$\lambda_{m-1} - \frac{FWHM_{m-1}}{2} \leq \lambda_{ref} \leq \lambda_{m-1} + \frac{FWHM_{m-1}}{2} \quad (1)'$$

-continued $$\lambda_{Em-max} < \lambda_{ref} < \lambda_{m-2} \quad (2)'$$

where $$\lambda_{m-1} = \frac{m}{m-1} * \lambda_m$$

$$\lambda_{m-2} = \frac{m}{m-2} * \lambda_m$$

$$FWHM_{m-1} = \frac{\lambda_{m-1}^2}{m * \lambda_m} * \frac{1-R}{\pi\sqrt{R}}$$

$$2nd\ \cos\theta = m\lambda_m$$

where m is an integer equal to or greater than 3, $\lambda_{ref}$ is the wavelength band of the light source for calibration, $\lambda_m$ is the peak wavelength proximate to the command wavelength, $\lambda_{m-1}$ and $\lambda_{m-2}$ are peak wavelengths other than the peak wavelength proximate to the command wavelength, $\lambda_{Em-max}$ is a longest wavelength of light incident on the image sensor, $FWHM_{m-1}$ is a full width at half maximum of the peak wavelength $\lambda_{m-1}$, R is a reflectance of surfaces, which face one another, of the pair of substrates, n is a refractive index of a medium between the pair of substrates, d is the surface interval between the pair of substrates, and θ is an angle of incidence of light from the object under observation on the pair of substrates.

10. A method of adjusting a spectral imaging apparatus that comprises: a spectral transmittance variable element having a spectral transmittance characteristics such that a transmittance periodically varies with wavelength and being capable of changing the variation period, for converting light from an object under observation into light having a plurality of peak wavelengths; and an image sensor for capturing an image of the object under observation with light in a wavelength band proximate to a command wavelength designated by a user, the method comprising:

by a light extracting device, extracting, from the light having a plurality of peak wavelengths as converted by the spectral transmittance variable element, light for imaging that contains a peak wavelength proximate to the command wavelength and light for calibration that contains a peak wavelength other than the peak wavelength proximate to the command wavelength; and by a control unit, calculating the peak wavelength that is proximate to the command wavelength and is contained in the light for imaging, from the peak wavelength that is other than the peak wavelength proximate to the command wavelength, is contained in the light for calibration and is detected by a detector, calculating an amount of shift between the peak wavelength proximate to the command wavelength as calculated and the command wavelength, and adjusting the variation period of the spectral transmittance variable element on a basis of the amount of shift.

* * * * *

UNITED STATES PATENT AND TRADEMARK OFFICE
CERTIFICATE OF CORRECTION

PATENT NO.       : 8,351,044 B2
APPLICATION NO.  : 12/729628
DATED            : January 8, 2013
INVENTOR(S)      : Shinya Matsumoto et al.

Page 1 of 1

It is certified that error appears in the above-identified patent and that said Letters Patent is hereby corrected as shown below:

In the Claims:

Column 23, line 16 (claim 9, line 36): It Should Read: $\lambda_{m-1}$ and $\lambda_{m-2}$ are peak wavelengths other than the peak wave- Signed and Sealed this
Fourteenth Day of May, 2013

Teresa Stanek Rea
*Acting Director of the United States Patent and Trademark Office*